United States Patent
Seto et al.

(10) Patent No.: US 9,673,430 B2
(45) Date of Patent: Jun. 6, 2017

(54) POWER SOURCE DEVICE, ELECTRIC VEHICLE COMPRISING POWER SOURCE DEVICE, ACCUMULATOR DEVICE

(71) Applicant: Sanyo Electric Co., Ltd., Osaka (JP)

(72) Inventors: Takashi Seto, Hyogo (JP); Toshiya Shimizu, Hyogo (JP); Yoshiyuki Furukoji, Hyogo (JP); Nobukazu Yamanishi, Hyogo (JP); Yasuhiro Asai, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 244 days.

(21) Appl. No.: 14/429,355

(22) PCT Filed: Oct. 1, 2013

(86) PCT No.: PCT/JP2013/005840
§ 371 (c)(1),
(2) Date: Mar. 18, 2015

(87) PCT Pub. No.: WO2014/064888
PCT Pub. Date: May 1, 2014

(65) Prior Publication Data
US 2015/0243947 A1    Aug. 27, 2015

(30) Foreign Application Priority Data

Oct. 26, 2012 (JP) .................................. 2012-237321

(51) Int. Cl.
*H01M 2/24* (2006.01)
*H01M 6/42* (2006.01)
(Continued)

(52) U.S. Cl.
CPC ....... *H01M 2/1077* (2013.01); *B60L 11/1877* (2013.01); *B60L 11/1879* (2013.01);
(Continued)

(58) Field of Classification Search
CPC .......... H01M 2/24; H01M 2/26; H01M 2/266; H01M 6/42; H01M 2/202; H01M 2/1077
See application file for complete search history.

(56) References Cited

U.S. PATENT DOCUMENTS

| | | | |
|---|---|---|---|
| 5,418,083 | A | 5/1995 | Tamaki et al. |
| 2006/0032667 | A1 | 2/2006 | Sato |

(Continued)

FOREIGN PATENT DOCUMENTS

| | | |
|---|---|---|
| CN | 102473889 | 5/2012 |
| CN | 102640324 | 8/2012 |

(Continued)

OTHER PUBLICATIONS

English Translation of Search Report issued Aug. 18, 2016 in related Chinese Application No. 201380055124.3.
(Continued)

*Primary Examiner* — Patrick Ryan
*Assistant Examiner* — Julian Anthony
(74) *Attorney, Agent, or Firm* — Wenderoth, Lind & Ponack, L.L.P.

(57) ABSTRACT

A power supply device comprises plural battery cells having electrode portions, and bus bars connecting the electrode portions of the plural battery cells each other. The bus bar comprises a thin portion thinner than the other portion formed in at least one part of the end edge of the bus bar, and are welded to the electrode portion of the battery cell through the thin portion. The electrode portion comprises a pedestal portion, and an electrode terminal projecting from the pedestal portion, and the thin portion is disposed at the side surface of the electrode terminal. By this, at the time of welding the bus bar the thin portion is directly welded to the electrode portion, and without using other parts of the welding ring or the like the welding process is streamlined.

18 Claims, 20 Drawing Sheets

(51) Int. Cl.
*H01M 2/10* (2006.01)
*H01M 2/20* (2006.01)
*H01M 2/30* (2006.01)
*B60L 11/18* (2006.01)
*H01M 2/26* (2006.01)
*H02J 7/00* (2006.01)

(52) U.S. Cl.
CPC ............ *H01M 2/206* (2013.01); *H01M 2/26* (2013.01); *H01M 2/305* (2013.01); *H02J 7/007* (2013.01); *H01M 2220/20* (2013.01)

(56) References Cited

U.S. PATENT DOCUMENTS

| | | | |
|---|---|---|---|
| 2009/0208836 A1* | 8/2009 | Fuhr | ................. H01M 2/024 429/158 |
| 2010/0173178 A1 | 7/2010 | Kim et al. | |
| 2011/0064993 A1 | 3/2011 | Ochi | |
| 2011/0159350 A1* | 6/2011 | Ochi | ................. H01M 2/1077 429/159 |
| 2012/0121954 A1 | 5/2012 | Harima et al. | |
| 2012/0302107 A1 | 11/2012 | Ramsayer | |
| 2013/0130100 A1 | 5/2013 | Kurata et al. | |
| 2013/0157113 A1 | 6/2013 | Yoshioka et al. | |
| 2013/0157115 A1 | 6/2013 | Kobayashi et al. | |
| 2013/0344378 A1* | 12/2013 | Kohara | ................. H01M 2/1016 429/158 |

FOREIGN PATENT DOCUMENTS

| | | |
|---|---|---|
| JP | 7-134976 | 5/1995 |
| JP | 9-092259 | 4/1997 |
| JP | 2004-265610 | 9/2004 |
| JP | 2008-146943 | 6/2008 |
| JP | 2009-231145 | 10/2009 |
| JP | 2010-161075 | 7/2010 |
| JP | 2011-060623 | 3/2011 |
| JP | 2012-138190 | 7/2012 |
| JP | 2012-151916 | 8/2012 |
| JP | 2013-127863 | 6/2013 |
| JP | 2013-145739 | 7/2013 |
| WO | 2011/016194 | 2/2011 |
| WO | 2011/067025 | 6/2011 |
| WO | 2012/011470 | 1/2012 |
| WO | 2012/029235 | 3/2012 |

OTHER PUBLICATIONS

International Search Report of PCT application No. PCT/JP2013/005840 dated Dec. 3, 2013.

* cited by examiner

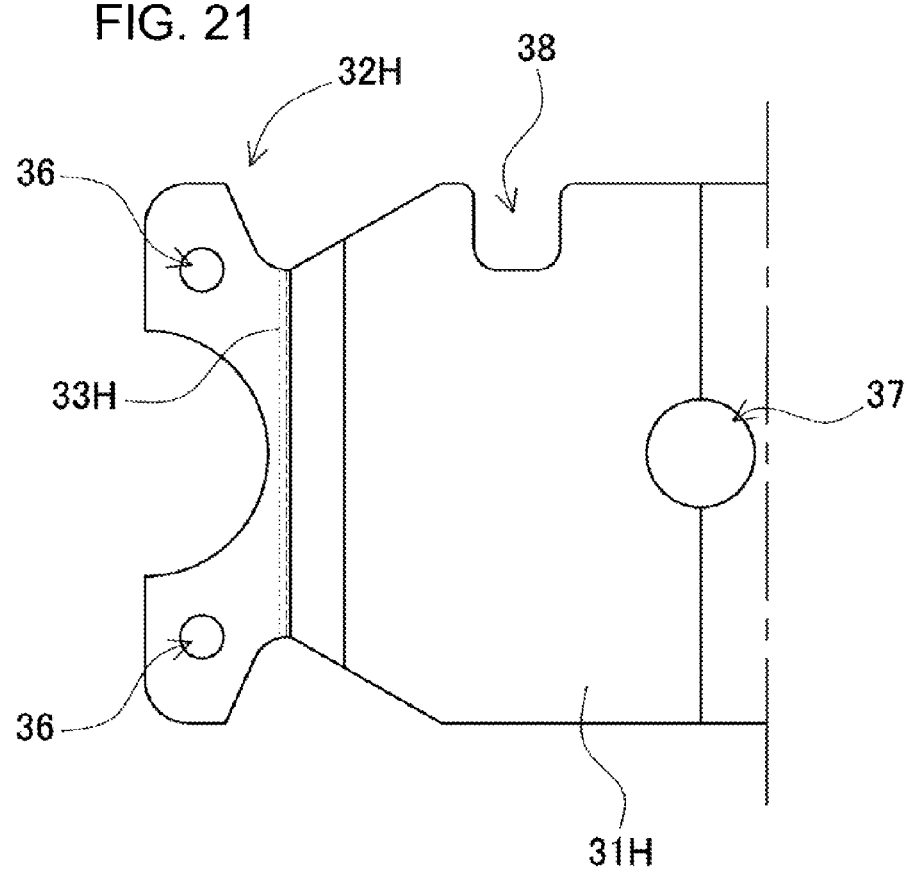

US 9,673,430 B2

POWER SOURCE DEVICE, ELECTRIC VEHICLE COMPRISING POWER SOURCE DEVICE, ACCUMULATOR DEVICE

TECHNICAL FIELD

The present invention relates to a power source device having a plurality of stacked battery cells, and to a vehicle and a storage battery device equipped with the power source device, and a method for manufacturing the power supply device, in particular, to a power source device for a motor driving installed in an electric vehicle such as a hybrid vehicle, fuel-cell vehicle, electric vehicle, or electric autobike, or to a power source device configured to supply high current such as in a home or industrial power storage application, and a vehicle and a storage battery device equipped with the power source device, and a method for manufacturing the power supply device.

BACKGROUND ART

A power source device for a motor driving installed in a vehicle, or a power source device being placed in a stationary state in a home or industrial power storage application has been developed. In such a power supply device, in order to make supply power big, a lot of rechargeable secondary batteries are connected in series, and then a battery stacked member is configured. Further, the plural battery stacked members are connected in series or parallel as necessary. In such battery stacked members, for example, plural battery cells having a rectangular box shape are stacked, interposing spaces therebetween, and end plates 223 are disposed at the end surfaces of the stacked member. Binding bars bind them. Further, electrode terminals of the adjacent battery cells are connected each other by bus bars. The bus bars are welded to the electrode terminals by laser welding (refer to patent literature 1).

These battery cells have the dispersion of manufacturing allowance or the like. In addition, as plural sheets of the battery cells are stacked, such dispersion is accumulated. In order to absorb such allowance, a bus bar 2230 which opens an enlonged hole as shown in FIG. 25, is welded to an electrode terminal 2220 of a battery cell 2201 through a welding ring 2235.

In this method, the welding ring is disposed at a predetermined position by parts feeder, and the welding ring are imaged by a camera, and the position is adjusted based on an image processing, and those are welded by a laser beam radiation.

However, this method has a problem of a process in which the welding ring is disposed and positioned takes time. Especially, according to a request of large output in recent years, a number of the battery cells used in the power supply device increases, and accordingly it is a problem that tact time is shorted at the time of manufacturing.

CITATION LIST

Patent Literature

Patent Literature 1: Japanese Laid-Open Patent Publication No. 2011-60623
Patent Literature 2: Japanese Laid-Open Patent Publication No. 2012-138190
Patent Literature 3: Japanese Laid-Open Patent Publication No. 2008-146943
Patent Literature 4: Japanese Laid-Open Patent Publication No. 2009-231145

SUMMARY OF THE INVENTION

The present disclosure is developed for the purpose of solving such drawbacks. One non-limiting and explanatory embodiment provides a power supply device, a vehicle and a storage battery device equipped with power supply device, and a method for manufacturing which allow welding of a bus bar in a short time without using a welding ring.

A power supply device of the present disclosure comprises plural battery cells having electrode portions, and bus bars connecting the electrode portions of the plural battery cells each other, and the bus bar comprises a thin portion thinner than the other portion formed in at least one part of the end edge of the bus bar, and are welded to the electrode portion of the battery cell through the thin portion. Accordingly, at the time of welding the bus bar, the thin portion is directly welded to the electrode portion, and without using other parts of the welding ring or the like the welding process is streamlined.

Moreover, in the power supply device of the present disclosure, the thin portion is formed in a recess shape as a recess shaped portion which is recessed from the end edge of the bus bar. Accordingly, the length in the welding portion of welding the bus bar to the electrode portion is made long, and coupling strength can be improved.

Moreover, in the power supply device of the present disclosure, the width of the thin portion is less than half the electrode portion. Accordingly, when the bus bars are disposed to both sides of the pedestal portion, welding portion welded to each of the bus bars is appropriately obtained.

Moreover, in the power supply device of the present disclosure, the electrode portion comprises a pedestal portion, and an electrode terminal projecting from the pedestal portion, and the thin portion is disposed at the side surface of the electrode terminal. Accordingly, the electrode terminal projecting from the pedestal portion is used as the guide for positioning, and then the positioning work of the bus bar is easily carried out.

Moreover, in the power supply device of the present disclosure, the electrode terminal is in a cylindrical shape, and the recess shaped portion is formed in a semicircular shape along the cylindrical shape of the electrode terminal. Accordingly, the length in the welding portion of the electrode terminal and the bus bar is made long, and coupling strength can be improved.

Moreover, in the power supply device of the present disclosure, a radius of the semicircular shaped portion is larger than a radius of the electrode terminal. Accordingly, the electrical terminal is disposed at the semicircular shaped portion, and such a position is adjusted, and then positional slippages of the electrode terminals can be absorbed.

Moreover, in the power supply device of the present disclosure, the thin portion of the bus bar is formed to be capable to be resiliently deformed. Accordingly, at the time of welding the bus bar to the electrode portion, the welded thin portion is resiliently pressed, and a space in a welding portion is prevented, and then reliability of welding can be improved.

Moreover, in the power supply device of the present disclosure, the bus bar is bent in a mountain shape in a sectional view. Accordingly, both end portions of the bus bar project downward, namely to the battery cell side, and then a space between the bus bar and the electrode portion can be prevented.

Moreover, in the power supply device of the present disclosure, the thin portion of the bus bar is bent in the reverse direction to the bent direction of the mountain shape. Accordingly, further both ends of the bus bar can easily contact the electrode portion, and then a space of welding portion san be prevented.

Moreover, in the power supply device of the present disclosure, the thin portion is welded to the electrode portion by fiber laser. Accordingly, the thin portion is accurately welded by laser beam having a small spot diameter and high output power, and reliability of welding can be improved.

Moreover, in the power supply device of the present disclosure, the bus bar comprises a clad metal in which dissimilar metals are joined. Accordingly, when the electrode portions are made of the different metals, materials which easily are coupled to the metals of the electrode portions are selected, and the bus bar is made from the clad metal of such metals, and the reliability of coupling to the electrode portion can be improved.

Moreover, an electric vehicle equipped with the power supply device of the present disclosure comprises an electric motor being energized by electric power that is supplied from the power supply device, a vehicle body having the power supply device and the electric motor, and a wheel being driven by the electric motor, and driving the vehicle body.

Moreover, a storage battery device equipped with the power supply device of the present disclosure comprises a power supply controller controlling charging and discharging of the power supply device, and the power supply device is charged with an external power by the power supply controller, and charging of the power supply device is controlled by the power supply controller.

Moreover, a method for manufacturing a power supply device of the present disclosure including plural battery cells having electrode portions and conductive bus bars connecting, comprises a disposing step in which the bus bar comprises a thick portion formed at the center of the bus bar and a thin portion thinner than the thick portion formed in at least one part of the end edge of the bus bar, and in a state that the bus bar is bent in a mountain shape in a sectional view, the thin portion is disposed on flat surfaces of pedestal portions formed on the adjacent electrode portions of the adjacent battery cells in the upper surface of the battery cell stacked member stacking the plural battery cells, and a welding step in which laser beam is irradiated to penetrate the thin portion, and also the thin portion including welding portion and the pedestal portion are melted, and then those are welded. Accordingly, at the time of welding the bus bar the thin portion is directly welded to the electrode portion, and without using other parts of the welding ring or the like the welding process is streamlined.

BRIEF DESCRIPTION OF DRAWINGS

FIG. 21 is a plan view showing position of laser welding in the bus bar of FIG. 20.

DESCRIPTION OF EMBODIMENTS

Hereinafter, the embodiment of the present invention will be described referring to drawings. However, the following embodiments illustrate a power supply device, a vehicle and a storage battery device equipped with the power supply device, and a method for manufacturing the power supply device which are aimed at embodying the technological concept of the present invention, and the present invention is not limited to the power supply device, the vehicle and the storage battery device equipped with the power supply device, and the method for manufacturing the power supply device described below. In particular, as long as specific descriptions are not provided, it is not intended that the claims be limited to sizes, materials, shapes, and relative arrangements of constitutional members described in the embodiments, which are mere descriptive examples. It is noted that the magnitude or positional relation of the members illustrated in each diagram is sometimes grandiloquently represented, in order to clarify the description. Furthermore, in the description below, identical names and reference numbers represent identical or homogeneous members, and detailed descriptions are appropriately omitted. Moreover, mode may be applied where each element constituting the present invention constitutes a plurality of elements with the use of the same member, thereby serving the plurality of elements with the use of one member, or, in contrast, mode may be realized where a function of the one member is shared by a plurality of members. Also, a portion of examples and the content described in the embodiments can be applied to other examples and another embodiment.

Embodiment 1

Figure 1:
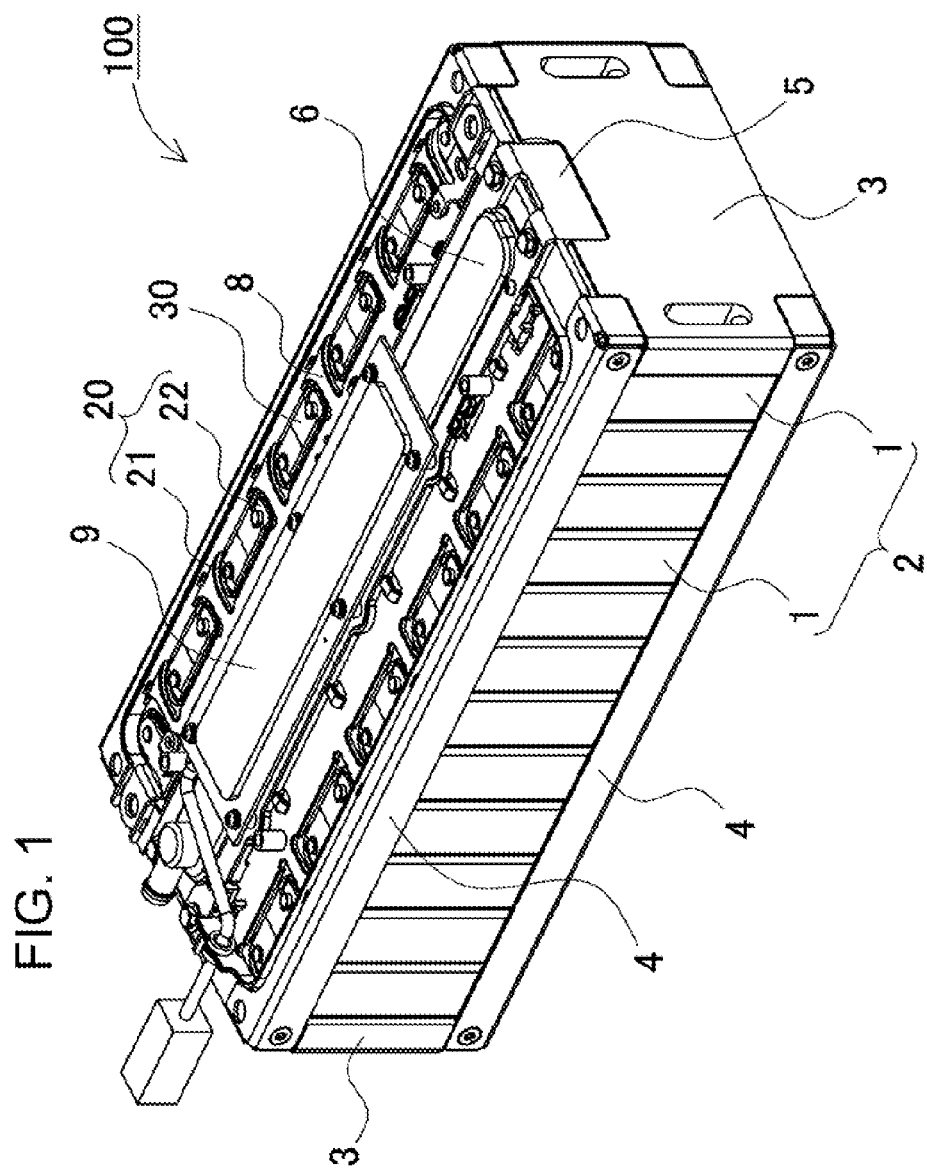
FIG. 1 is a perspective view of a power supply device related to an embodiment 1 of the present invention.
Figure 2:
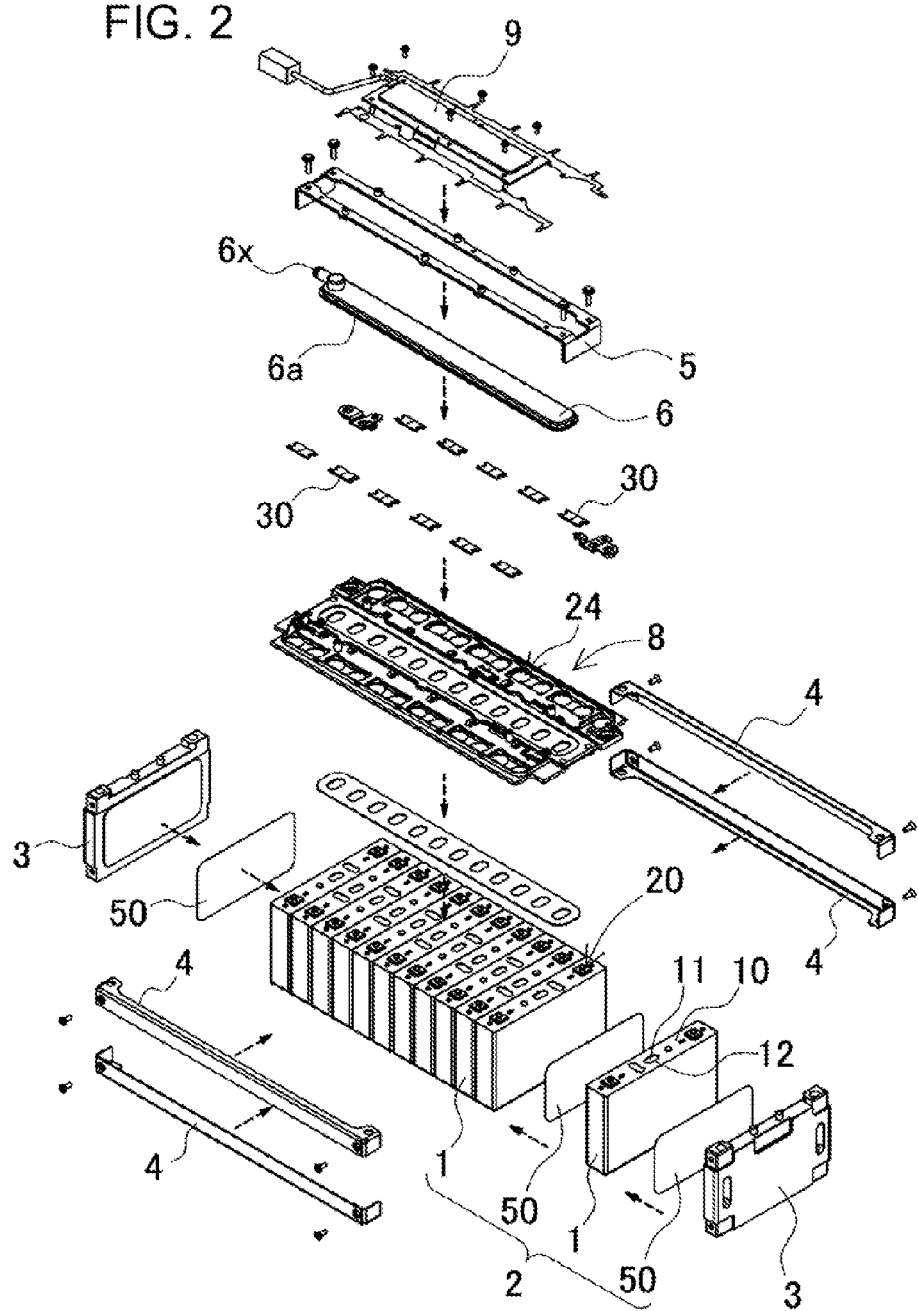
FIG. 2 is an exploded perspective view of the power supply device in FIG. 1.
Figure 3:
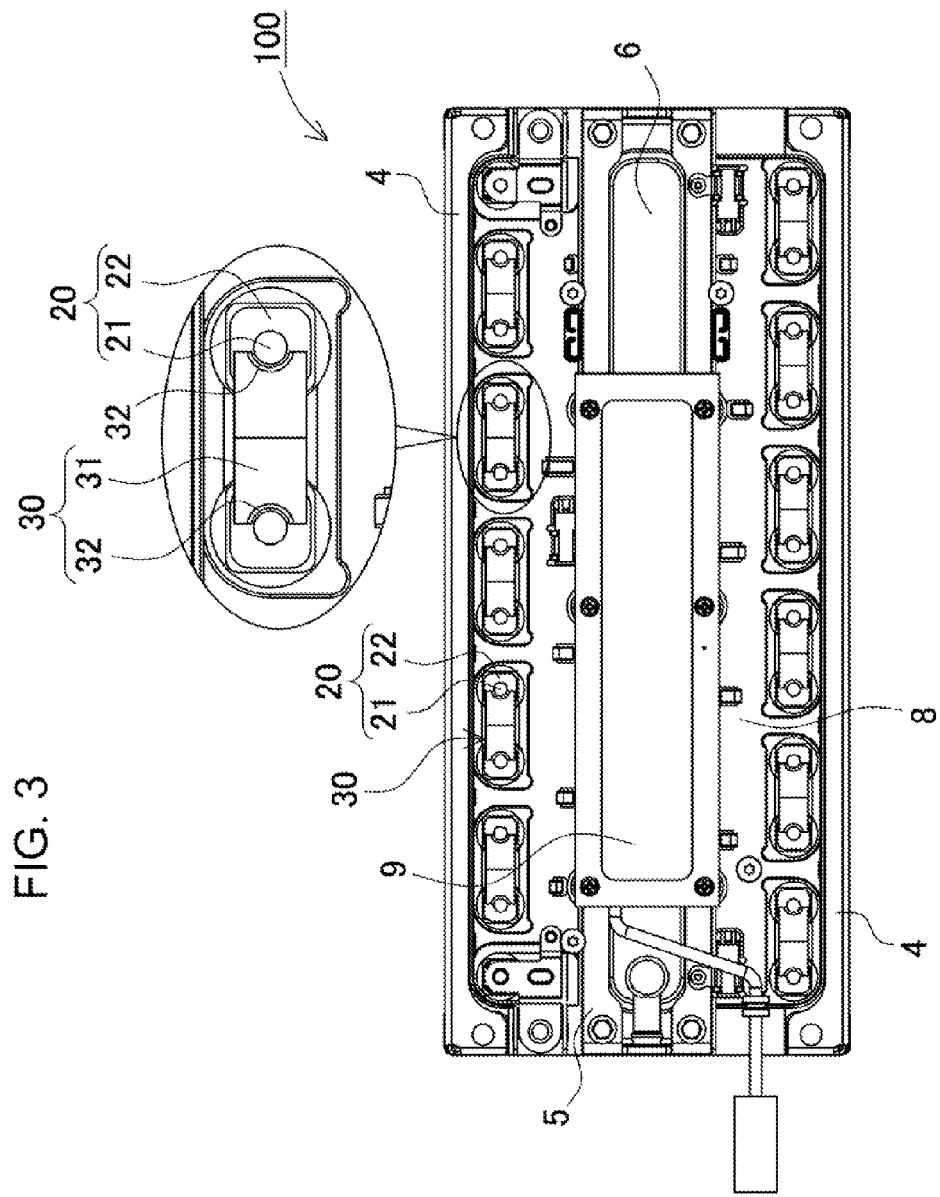
FIG. 3 is a schematic plan view of the power supply device in FIG. 1.
Figure 4:
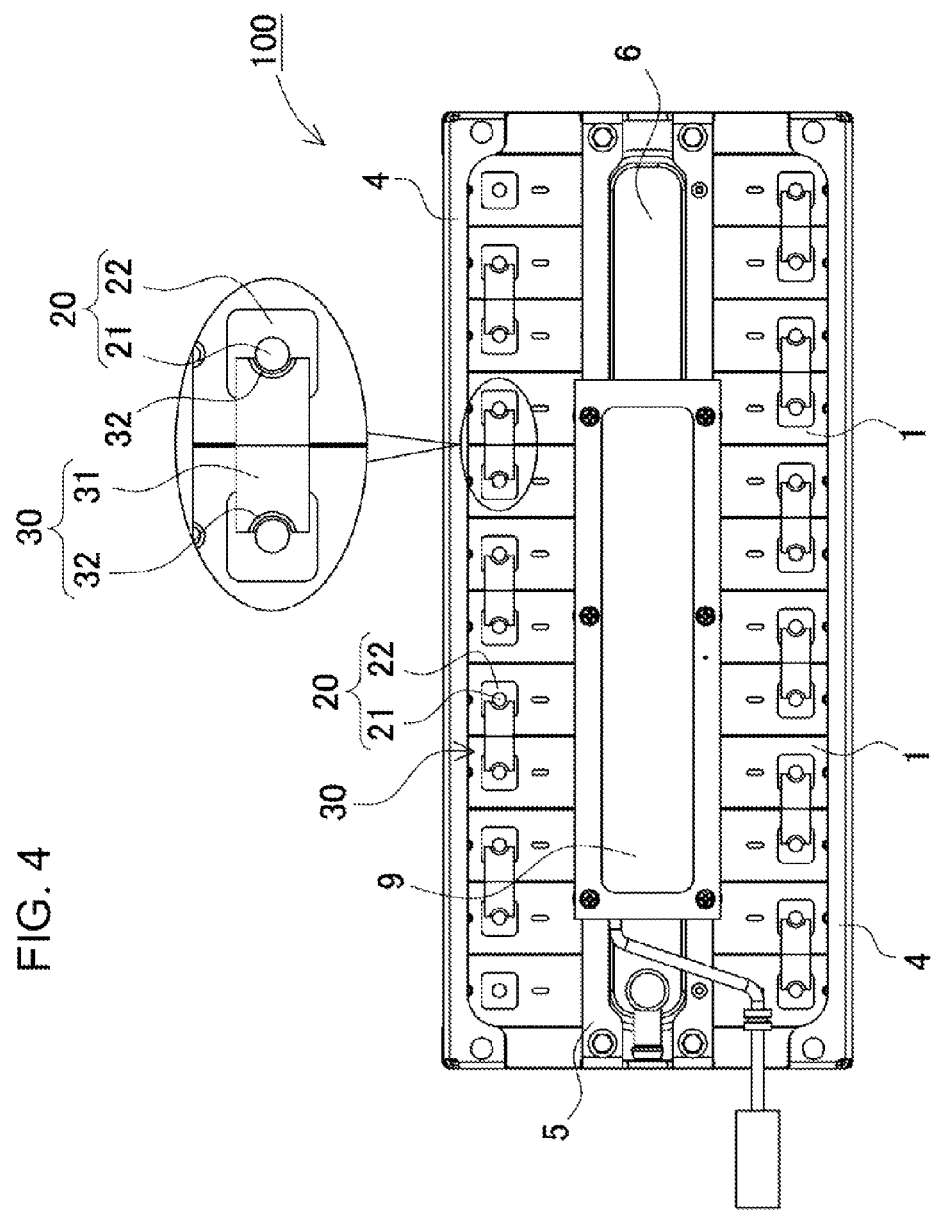
FIG. 4 is a schematic plan view in a state that a bus bar holder is removed from FIG. 3.

FIG. 1 shows a perspective view of a power supply device related to an embodiment 1 of the present invention, and FIG. 2 shows an exploded perspective view of the power supply device in FIG. 1, and FIG. 3 shows a schematic plan view of the power supply device in FIG. 1, and FIG. 4 shows a schematic plan view in a state that a bus bar holder is removed from FIG. 3. The power supply device shown in these figures comprises plural sheets of battery cells 1, spaces disposed between the battery cells, end plates 3 which are disposed at each of end surfaces of a battery stacked member 2 where the battery cells 1 and the spaces 50 are alternately stacked, and binding members 4 binding the end plates 4 each other.
(Battery Cell 1)

As shown in FIG. 1 and FIG. 2, in the battery cells 1 the width is longer than the thickness, in other words, the battery cell 1 has a rectangular box shape which is thinner than the width. The plural sheets of the battery cells 1 which are stacked in the thickness direction, constitute the battery stacked member 2. Each of the battery cells 11 is a lithium ion secondary battery. But, as the battery cell, a secondary battery, for example, a nickel hydride battery, a nickel cadmium battery, or the like can be used. The battery cell 1 of FIG. 2 has both wide rectangular surfaces, and the battery stacked member 2 is constituted by facing the wide rectangular surfaces of the battery cells 1. In each of the battery cells 1, positive and negative electrode portions 20 are provided at both end potions of the upper surface of the sealing plate 10, and the gas exhaust opening 12 of the gas exhaust valve 11 is provided at the center thereof. Each of the electrode portions 20 comprises a pedestal portion 22, and an electrode terminal 21 projecting from the pedestal portion 22. The electrode terminal is formed in a cylindrical shape.

In the rectangular battery cell 1, the tubular outer can having the bottom portion closing the bottom and the upper opening, is formed by pressing the metal board, and the upper opening is airtightly closed by the sealing plate 10. The sealing plate 10 is a flat metal board, and its outer shape is the shape of the upper opening. The sealing plate 10 is fixed to the peripheral edge of the outer can by laser welding, and airtightly closes the upper opening of the outer can. In the sealing plate 10 fixed to the outer can, positive and negative electrode portions 20 are fixed at both end portions of the upper surface of the sealing plate 10, and the gas exhaust opening 12 is provided at the intermediate portion between the positive and negative electrode portions 20.

the gas exhaust valve 11 inside the gas exhaust opening 12 is provided.

The spacer 15 is made of insulating material in order to insulate the outer cans of the battery cells from each other. The end plates 3 are made of high rigidity material, for example, metal or the like, in order that the end plates 3 bind the battery stacked member 2 in a stacked state. Further, the binding member 4 is similarly made of metal or the like as high rigidity material. Here, the metal board is bent in a U-shaped cross-section, and end portions of the binding member 4 are fixed to the end plates 3 by screw or the like. In addition, the binding member binds the battery stacked member 2, and also the binding member fixes a gas duct on the upper surface of the battery stacked member 2. In this embodiment, the binding members 4 bind the battery stacked member 2 at the side surface thereof, and further a second binding member 5 is provided on the upper surface of the battery stacked member 2. Here, this structure is one instance, and the binding member can bind only the side surface of the battery stacked member 2 without the second binding member. Further, the gas duct can be omitted.
(Bus Bar Holder 8)

The bus par holder 8 is fixed on the upper surface of the battery stacked member 2. The bus bar holder 8 is made of insulating material, and in order to avoid unintentional conducting between the bus bars 30 and the battery cells 1, the bus bar holder 8 covers the upper surface of the battery cells 1. In a state that the bus bar holder 8 is fixed on the upper surface of the battery stacked member 2, the opening windows 24 are opened in order to expose and connect the electrode terminals 21. Therefore, while the upper surfaces of the battery cells 1 are insulated except portions necessary to electrically connect, by the electrode terminals 21 exposed through the opening windows 24, electrical connections between the electrode terminals 21 are kept.

As shown in the exploded perspective view of FIG. 2, the bus bar holder 8 is fixed by the second binding member 5. Here, the bus bar holder 8 is pressed by the second binding member 5 from above, and then the end portions of the second binding member 5 is fixed by screw on the upper surface of the end plate 3. By this, the bus bar holder 8 is fixed on the upper surface of the battery stacked member 2 through the second binding member 5. Here, the fixing structure of the bus bar holder is not limited to this structure, for example, the bus bar holder is fixed directly on the end plate, or the hook portion or the like as the press-fitted structure is provided on the bus bar holder, and it is press-fitted to the bus bar or the binding member. In this way, other conventional fixing structures can be properly used.
(Gas Duct 6)

Further, in the power supply device 100 shown in FIG. 2, the gas duct 6 is fixed on the upper surface of the bus bar holder 8, and a circuit board 9 is disposed on the upper surface of the gas duct 6. The gas duct 6 has a hollow tubular shape, and a duct exhaust portion 6x opens at an end portion of the gas duct 6. At the bottom surface side of the gas duct 6, a joining aperture opens at the position corresponding to the gas exhaust valve 11 of each of the battery cells 1. The gas duct 6 is made so as to guide a high pressure gas exhausted through the joining aperture coupled to the gas exhaust opening 12 from the battery cell at the time of the gas exhaust valve opening. Further, a duct exhaust portion 6x opens at an end portion of the gas duct 6, and the other end portion of the gas duct 6 is closed. The duct exhaust portion 6x is coupled to an external gas exhaust duct, and then gas is safely exhausted outside. This gas duct 6 is fixed on the upper surface of the battery stacked member 2 so as to position the joining aperture to be coupled to the gas exhaust opening 12. At the bottom surface side of the gas duct 6, a joining aperture 6b opens at the position corresponding to the gas exhaust valve 11 of each of the battery cells 1. The joining apertures 6b are respectively coupled airtightly to the gas exhaust openings 12 in a state of the gas exhaust valve 11 opening, and the high pressure gas exhausted from the battery cells 1 is guided within the gas duct 6. Further, in the inner portion of the gas duct 6, one end of the gas duct 6 is closed, and the other end of the gas duct 6 is opened. The duct exhaust portion 6x is coupled to an external gas exhaust duct 36, and the gas is safely exhausted outside. In the instance of FIG. 2, a sectional view of the gas duct 6 in the extended direction is in a laterally long rectangular shape. Here, the inner shape of the gas duct 6 can be an arbitrary shape, for example, such as, a tubular shape, an inverted U-shape, a U-shape, or the like.

Here, in the instance of FIG. 2, the second binding member 5 also fix the gas duct 6. Namely, a flange portion 6a projecting outward at the periphery of the gas duct 6, and an opening is provided in the second binding member 5, and the second binding member 5 covers the gas duct 6 from above so that the gas duct 6 goes through the opening. The flange portion 6 at the periphery of the gas duct 6 is pressed by the peripheral portion of the opening, and then the gas duct 6 is fixed on the upper surface of the bus bar holder 8.
(Circuit Board 9)

Further, the circuit board 9 including electrical circuits is fixed on the upper surface of the gas duct 6. The electrical circuits included in the circuit board 9 are a protection circuit, a controlling circuit or the like to monitor voltage of the battery cell 1 or the like. The circuit board 9 is shorter than the length in the elongated direction of the gas duct 6, and its width is wider than that of the gas duct 6 in the direction perpendicular to the elongated direction.
(Voltage Detecting Line)

Further, in order to measure the cell voltage of each of the battery cells 1, a voltage detecting line is fixed to each of the bus bars 30 to detect the voltage. The voltage detecting line comprise conducting lead, harness, flexible printed board or circuit (FPC) or the like, and one end thereof is connected to the circuit board 9. In the instance of FIG. 2 and FIG. 3, the voltage detecting line of the FPC is fixed on the upper surface of the bus bars 30.
(Fiber Laser)

Each of the battery cells 1 has a pair of the positive and negative electrode portions 20. In a state of stacking the battery cells 1, the electrode portion 20 of the adjacent battery cells 1 are connected by the bus bar 30 having conductivity. By connecting way of the bus bar 30, the battery cells 1 are connected in series or parallel. In the instance of FIG. 4, by connecting the positive electrode terminal and the negative electrode terminal of the adjacent battery cells by the bus bars 30, twelve of the battery cells 1 are connected in series.

This bus bar 30 is welded to the electrode portion 20, and the electrode portions 20 of the adjacent battery cells 1 are electrically connected each other. In the instance of FIG. 4, the bus bar 30 is melted and fixed to the electrode portion 20 by laser welding. As a laser beam, for example, a fiber laser is suitably used. The fiber laser enables a spot diameter to be small, compared with YAG laser or the like. Therefore, it has high output power, and it is suitable for the accurate laser welding.

(Bus Bar 30)

Figure 5:
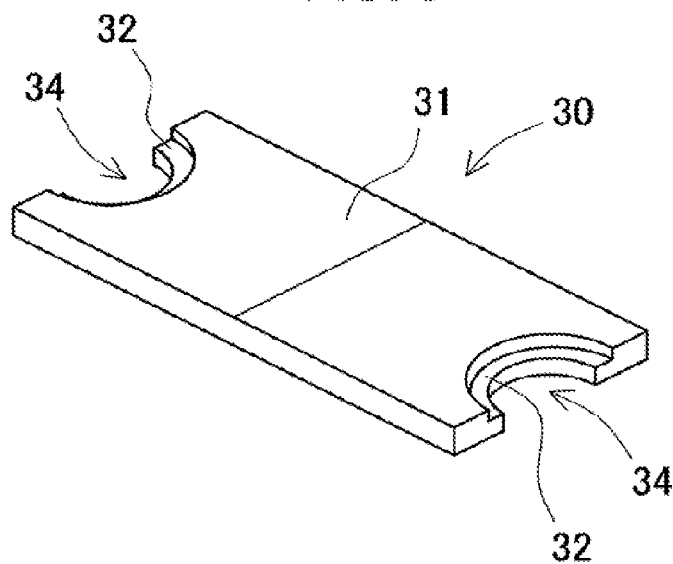
FIG. 5 is a perspective view of a bus bar in FIG. 4.
Figure 6A:
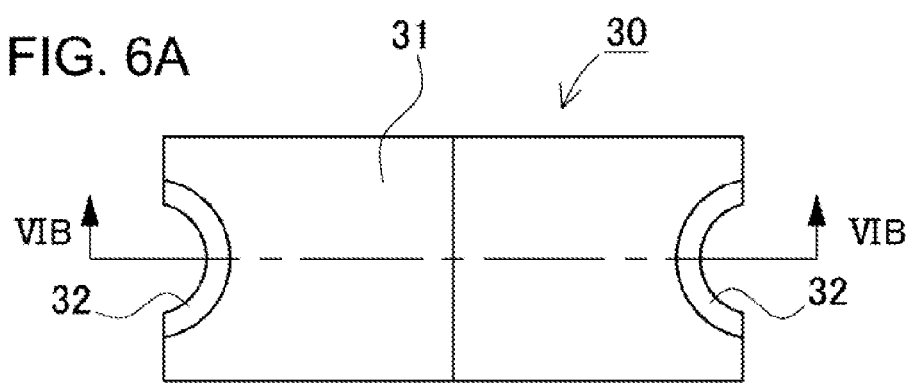
FIG. 6A is a plan view of the bus bar in FIG. 5.
Figure 6B:
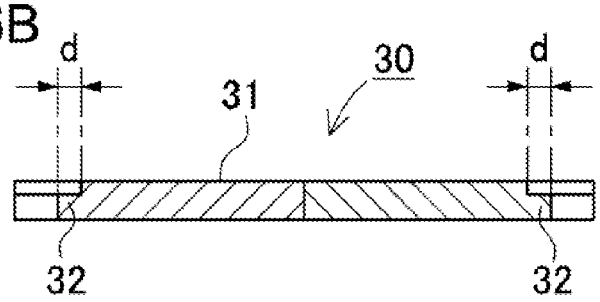
FIG. 6B is a vertical sectional view along a line VIB-VIB of the bus bar in FIG. 6A.

Preferably, the bus bars 14 is made of metal board having excellent conductivity and suitable for laser welding. FIG. 5 is a perspective view of a bus bar in FIG. 4, and FIG. 6A is a plan view of the bus bar, and FIG. 6B is a vertical sectional view of the bus bar. As shown in these figures, the bus bar 30 configures a board having an approximately uniform thickness. Especially, in order that a resistance of the bus bar is decreased, the bus bar 30 configures the metal board having high conductivity, and is a thick and low resistance portion. Additionally, preferably, a thick portion 31 of the bus bar 30 configured in this way comprises a clad metal in which dissimilar metals are joined in order to easily weld it to the positive and negative electrode portions 20 respectively. For example, in the lithium ion battery, generally, the positive electrode is an aluminum board, and the negative electrode is a copper board. Therefore, when the bus bar configures one of the aluminum board and the copper board, the dissimilar metal contact of copper and aluminum happens at one of the positive electrode or the negative electrode, and the strength becomes weak. Therefore, the bus bar 30 configures the clad metal in which dissimilar metals are joined, and the aluminum board contacts the positive electrode, and the copper board contacts the negative electrode, and then the same kind of the metals are welded, and reliability of welding can be increased.
(Thin Portion 32)

Further, a thin portion 32 is partially formed at both ends of the thick portion 31 of the bus bar 30. This thin portion includes a welding portion 33 which is welded to a flat surface of the pedestal portion. As shown in the sectional view of FIG. 6B, the thin portion 32 is more thinly formed than the thick portion 31 at the center of the bus bar 30 in order that the bus bar 30 is easily welded to the electrode portion 20. In the instance of FIG. 6B, the thin portion 32 is formed in a step shape in the sectional view. The thinner the bus bar is, the easier it is to be welded. On the other hand, current resistance is increased. Accordingly, the thick portion 31 is formed approximately at the center of the bus bar 30, and the thin portion 32 is formed at the end edge thereof. Thus, the bus bar can be easily welded, and also an increase of current resistance can be suppressed. Further, as shown in FIG. 6A, the thin portion is formed in a step shape at the end edge of the bus bar where the upper surface side is cut out. In this way, the thin portion is formed to be cut out, not from the lower surface side of the end edge of the bus bar, but from the upper surface side of the end edge of the bus bar. By this, the lower surface side can contact the pedestal portion with large area, and it is surely welded by the laser beam penetrating the thin portion.

Additionally, it is desirable that the end edge of the bus bar 30 is not linear, but non-linear. By this, when the welding portion 33 is provided along the end edge of the bus bar 30, it makes the length of the welding portion 33 long, and then the strength can be improved. For example, the edge portion is formed in a recess or concave shape in the plan view which is recessed such that a part of the end edge is cut out. Then, by curving in this way, the length of the welding portion 33 is made longer. The electrode terminal 21 is disposed to a recess shaped portion 34, and then the electrode terminal 21 can be used as a guide at the time in positioning of the bus bar. For example, at the time of disposing the bus bar by parts feeder, a circle shape of the side surface of the electrode terminal 21 is detected by an image processing, and it becomes easy to dispose the bus bar 30 so as to be along this.

In the instance of the plan view in FIG. 6A, both end edges of the bus bar 30 in the elongated direction are formed in a semicircular shape of the thin portion 32 with a constant width d along the cylindrical shape of the electrode terminal 21. At this time, it is desirable that a radius of the curved portion as the semicircular shaped portion is larger than a radius of the electrode terminal 21. By this, the electrode terminal 21 can be disposed to the recess shaped portion 34. Namely, as shown in the plan view of FIG. 4, as the thick portion 31 can be disposed near the electrode terminal 21, the contacting area between the back surface of the thick portion 31 and the pedestal portion 22 become large.

By manufacturing allowance or swell of the battery cell, the dispersion of the distances between the electrode terminals 21 occurs. As mentioned above, positional slippages of the electrode terminals can be absorbed by using the recess shaped portion 34 at the end edge of the bus bar 30. Namely, it is designed in advance that when the electrode terminal 21 is disposed to the recess shaped portion 34, a little space between both is made, and then by this space, positional slippages between the electrode terminal 21 and the end edge of the bus bar can be absorbed. In addition, the welding portion 33 of the bus bar is made curved portion of the recess or concave shape, and by this the length of welded portion can be long, compared with the linear end edge of the bus bar 30 as mentioned above, and then coupling strength can be improved. In this way, by the recess or concave shape of the end edge of the bus bar 30, positional slippages of the electrode terminal 21 can be absorbed, and also coupling strength can be improved.

Figure 25:
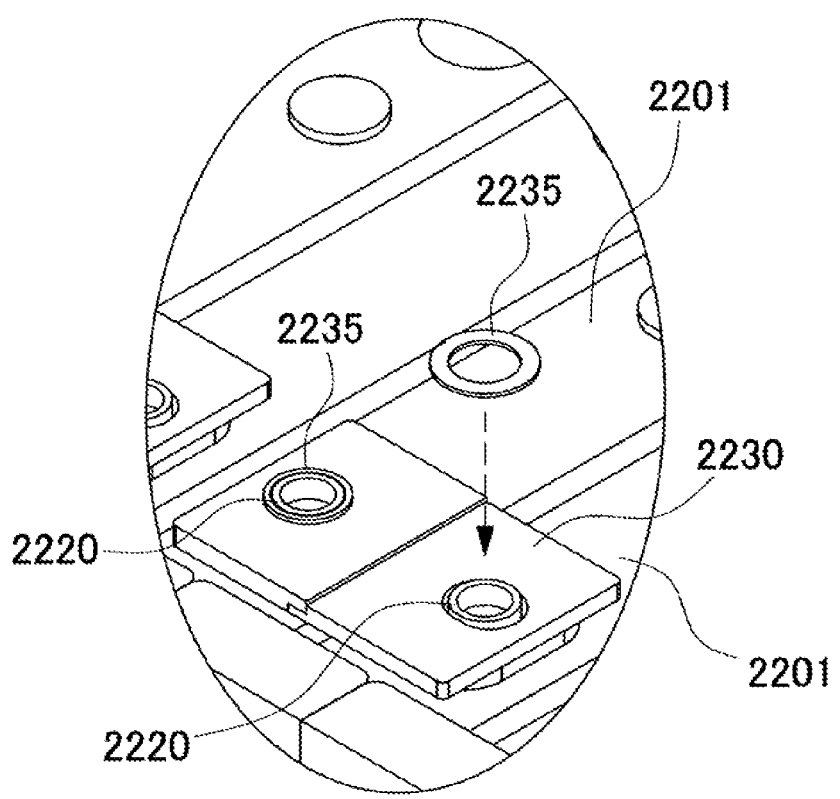
FIG. 25 is an exploded perspective view showing a method of welding a bus bar by a welding ring in the conventional technology.

Further, as the recess shaped portion 34 of the thin portion 32 opens outside, especially when a distance between the electrode terminals 21 becomes longer than a predetermined value, welding process can be done to the limit. Namely, as shown in FIG. 25, when a bus bar which opens an enlonged hole and a welding ring are used, a distance between the electrode terminals 21 is acceptable until the length of the enlonged hole. However, for example, when a distance between the electrode terminals 21 becomes longer by the swell of the battery cell or the like, there is a possibility that the bus bar breaks. On the other hand, as the recess shaped portion 34 of the thin portion 32 opens outside and does not have a closed hole, it prevents such breaking.

Figure 7:
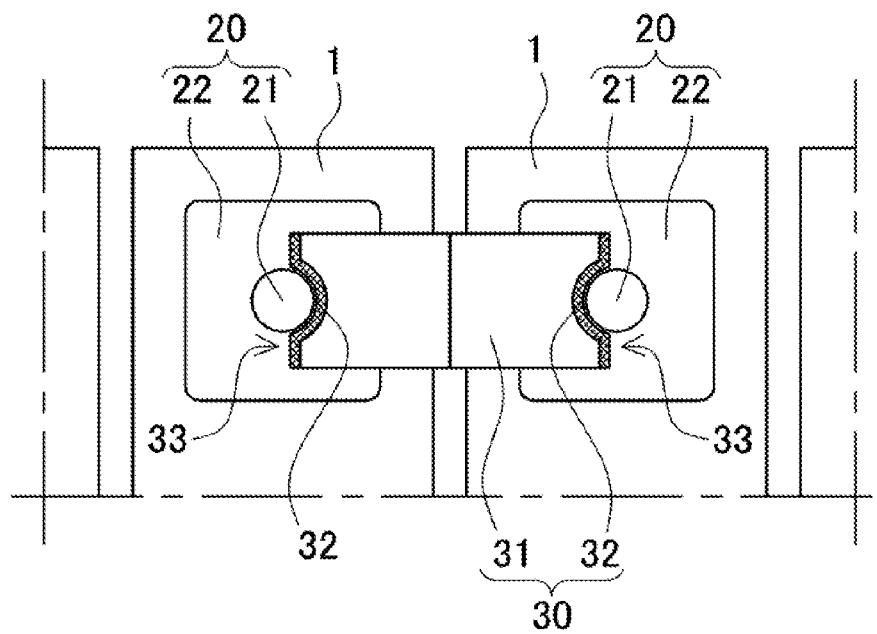
FIG. 7 is a schematic plan view showing laser welding portion of the bus bar and an electrode portion
Figure 8:
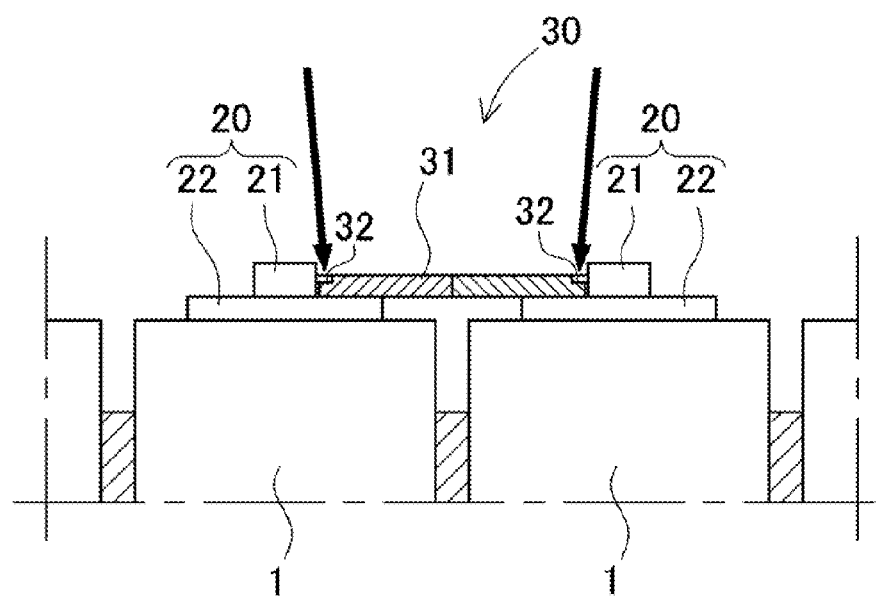
FIG. 8 is a schematic sectional view showing a state of laser welding of the bus bar and the electrode portion

When the bus bar 30 is welded to the electrode portion 20, as shown in a plan view of FIG. 7 and a sectional view of FIG. 8, the bus bar 30 is disposed on the upper surface of the battery cell 1 so as to stack the bus bar 30 on the pedestal portion 22. In this state, the laser beam is irradiated to the thin portion 32. The laser beam is irradiated on an area which is indicated by cross-hatching in the plan view of FIG. 7. Further, the laser beam is irradiated from the upward side of the bus bar 30b as shown by bold line in the sectional view of FIG. 8. By this, the thin portion 32 is melted, and is welded to the pedestal portion 22 in the below. Preferably, the laser beam penetrates the thin portion 32, and also the pedestal portion 22 is melted. As mentioned above, the fiber laser is suitably used for laser processing of high precision and high output. Here, it is not necessary to melt the whole thin portion 32, and it is acceptable to melt in the range of realizing adequate welding, and even though a part of the thin portion 32 remains without melting, it is acceptable.

Embodiment 2, 3

Figure 9:
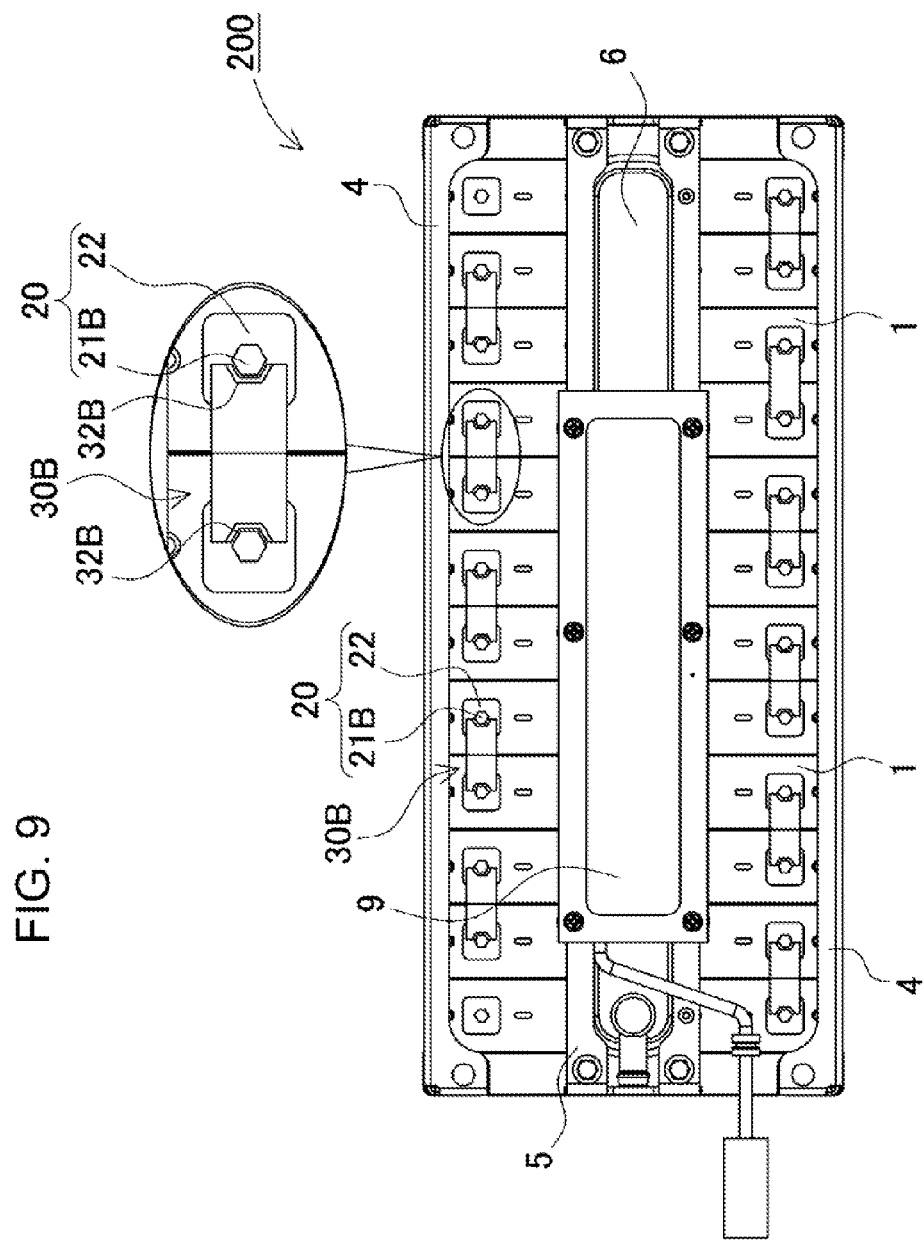
FIG. 9 is a schematic plan view of the bus bar related to the embodiment 2.
Figure 10:
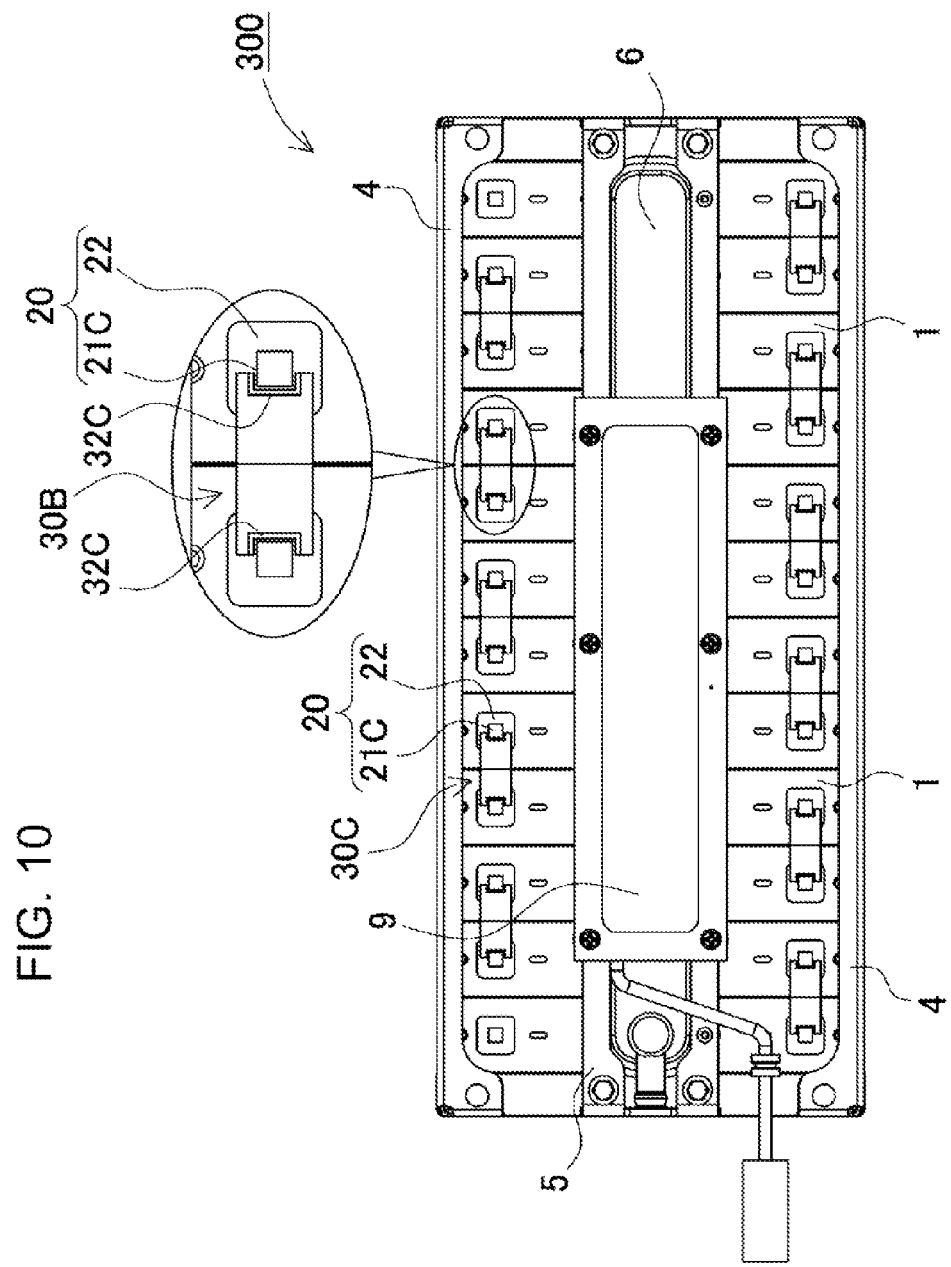
FIG. 10 is a schematic plan view of the bus bar related to the embodiment 3.

In the above instance, it is explained that the end edge of the bus bar has a semicircular shape. However, the shape of the end edge of the bus bar is not limited to this, and the shapes other than a linear shape can be applied. For example, in a power supply device 200 related to the embodiment 2 shown in FIG. 9, an electrode terminal 21B has a hexagonal shape in a plan view, and a recess shaped portion of the end edge of a bus bar 30B has a reverse isosceles trapezoid shape corresponding to this. Further, the recess shaped portion has a thin portion 32B. In addition, in a power supply device 300 related to the embodiment 3 shown in FIG. 10, an electrode terminal 21C has a quadrangle shape in a plan view, and a recess shaped portion of the end edge of a bus bar 30C has a C-shape corresponding to this, and in the same way a thin portion 32C is formed. In this way, the shape in a plan view of the electrode 21 is not limited to a circle, and an arbitrary shape, for example, a polygon shape, an elliptical shape, or the like can be applied. A recess shaped portion of the end edge of a bus bar has an appropriate shape corresponding to this. In addition, in the above instances, one of the recess shaped portion is formed at the center of the each end edge of a bus bar, but two or more of the recess shaped portions can be formed. According to this, plural thin portions can be applied. By this, the length of the welding portion 33 becomes long. In this case, plural recess shaped portions are not the same shape, and different shapes and patterns can be applied. For example, a large recess shaped portion is formed at the center, and smaller recess shaped portions than the large recess shaped portion can be formed at both sides of this. Moreover, a wave shape or a saw-toothed shape can be applied. In this way, the length of welding to the pedestal portion 22 can be made long, and coupling strength can be improved.

Embodiment 4

Figure 11A:
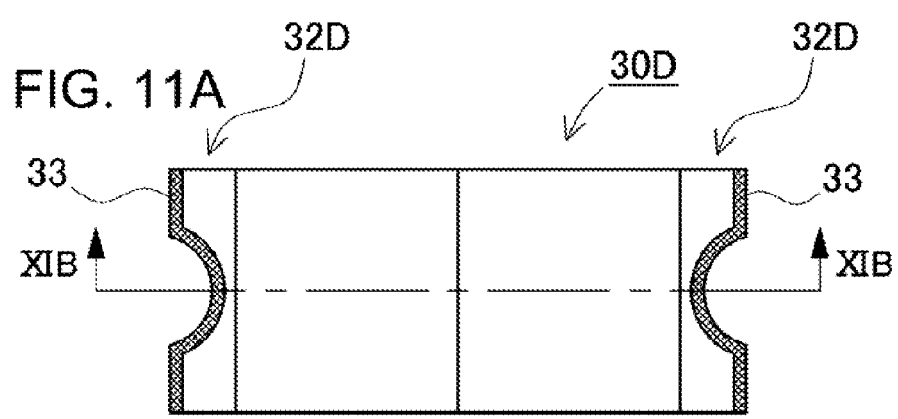
FIG. 11A is a plan view of the bus bar related to the embodiment 4.
Figure 11B:
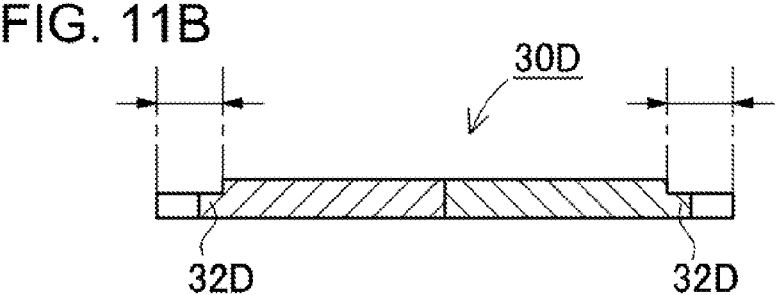
FIG. 11B is a vertical sectional view along a line XIB-XIB of the bus bar in FIG. 11A.
Figure 12:
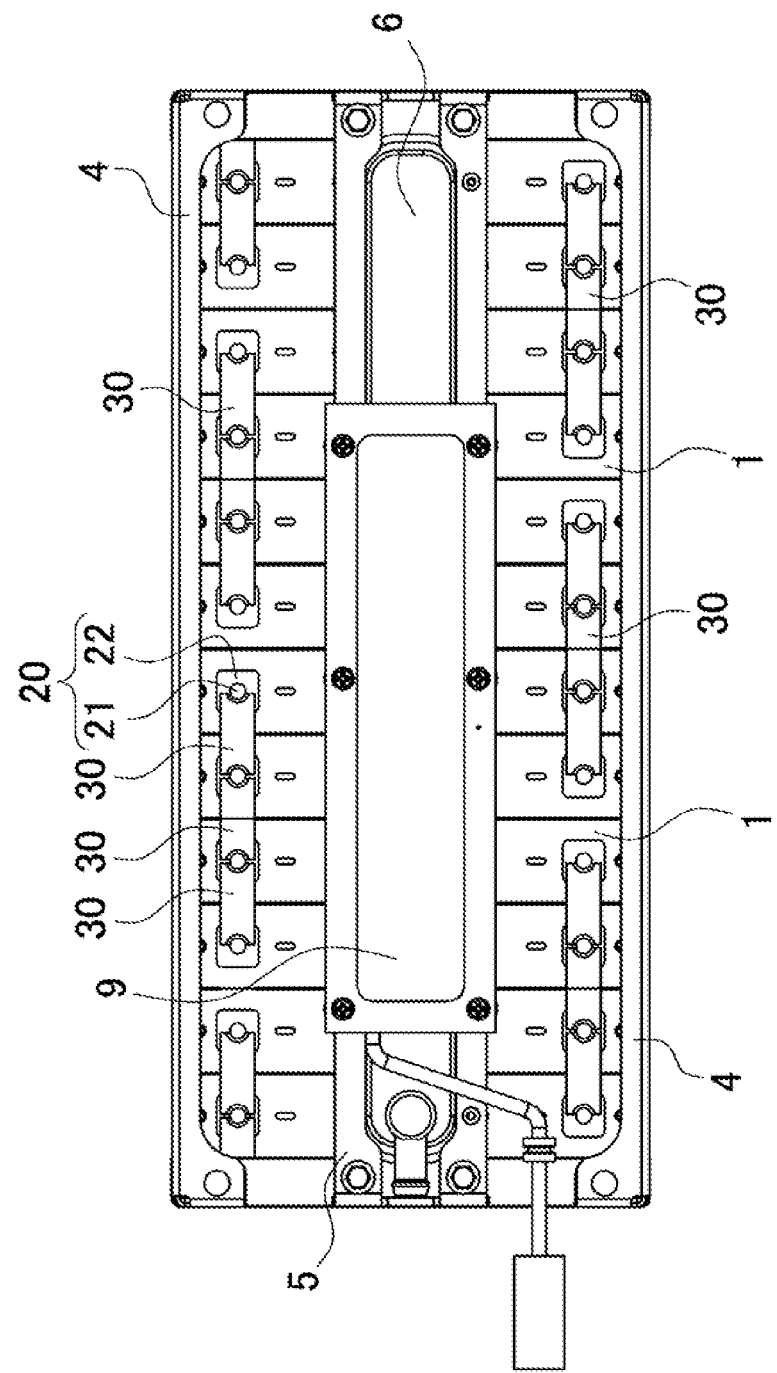
FIG. 12 is a plan view showing a power supply device where the battery cells are connected in parallel.

In the above instances, the thin portion is partially formed at the end edge of the thick portion 31 of the bus bar. Here, the thin portion can be formed at the whole end edge of the bus bar. This instance as the embodiment 4 is shown in FIG. 11. The bus bar 30D shown in this figure has the thin portion 32D of the width a from the end edge of the thick portion 31. It is desirable that the width of the thin portion 32D is less than half the pedestal portion 22. By this, when the bus bars are disposed to both sides of the pedestal portion 22, welding portion welded to each of the bus bars is appropriately obtained. For example, in a modified example shown in FIG. 12, when 2 pieces of the battery cell 1 are connected in parallel, it is necessary to weld at the electrode portion 20 such that both sides of the electrode terminal 21 are sandwiched between the bus bars 20. Even in this case, welding region can be obtained to appropriately weld each of the bus bars to the pedestal portion 22.

In addition, as the same way as the embodiment 1, a recess shaped portion can be formed at the center of the thin portion 32D. By this, as mentioned above, positional slippages of the electrode terminals 21 can be absorbed.

Figure 13:
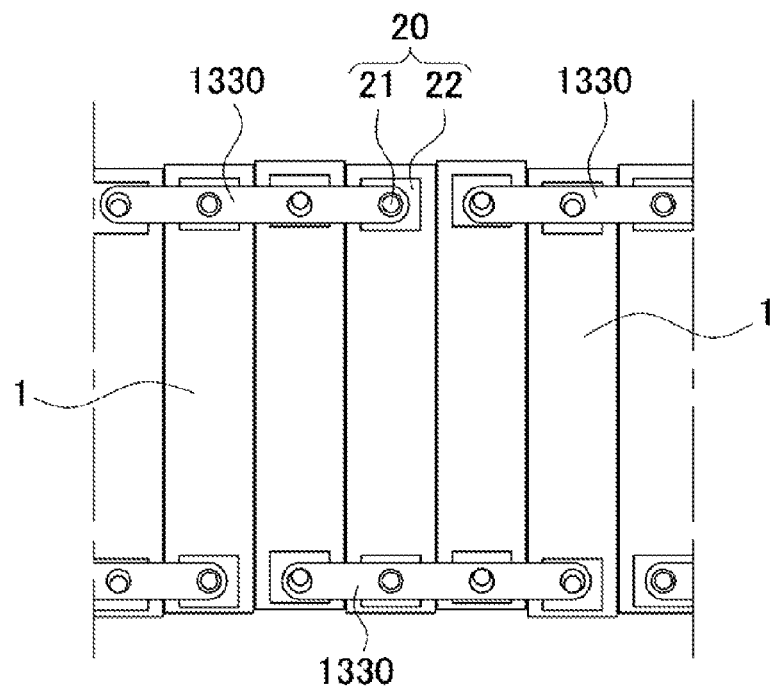
FIG. 13 is a plan view of connection of the bus bar in a comparative instance.
Figure 14:
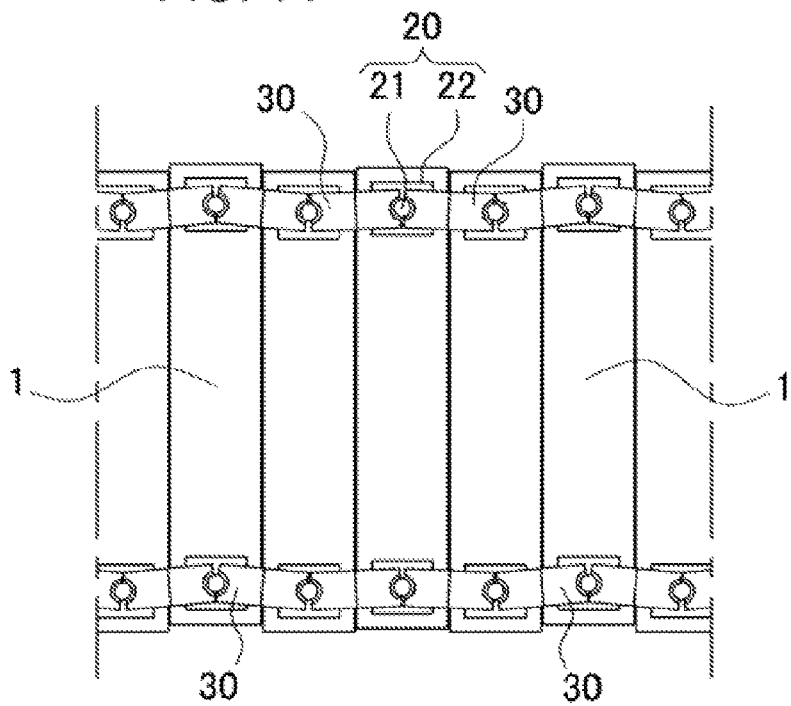
FIG. 14 is a plan view of connection instance of the bus bar in the embodiment.

In addition, this bus bar 30 is acceptable to connect the electrode portions of the stacked battery cells even though the dispersion of the positions in the electrode portions in a state that the battery cells are stacked occurs. Namely, as shown in a plan view of FIG. 13, when one of the bus bar 1330 is connected to three or more of the battery cells 1 (six pieces of the battery cells in FIG. 3), under the restriction of the size of the connected holes in which each of the electrode terminals 21 is inserted and opened in the bus bar 1330, it is impossible for the bus bar 1330 to correspond to the dispersion of the positions in the horizontal direction of the electrode terminals. Additionally, the dispersion of the positions in the vertical direction of the battery cell happens, it is more difficult for the bus bar 1330 to correspond such dispersion of the positions. On the other hand, according to this embodiment, as the electrode portions of the adjacent battery cells, namely only two portions are connected, as shown in FIG. 14 this embodiment can correspond to the dispersion of the positions in the battery cells 1. This is a reason why the bus bars are connected only between the adjacent electrode terminals 21. Further, even though the number of the bus bars 20 is increased, the welding locations are fundamentally the same as the case of FIG. 13, this embodiment does not have a demerit that it takes a long time to weld.

Embodiment 5

Figure 15:
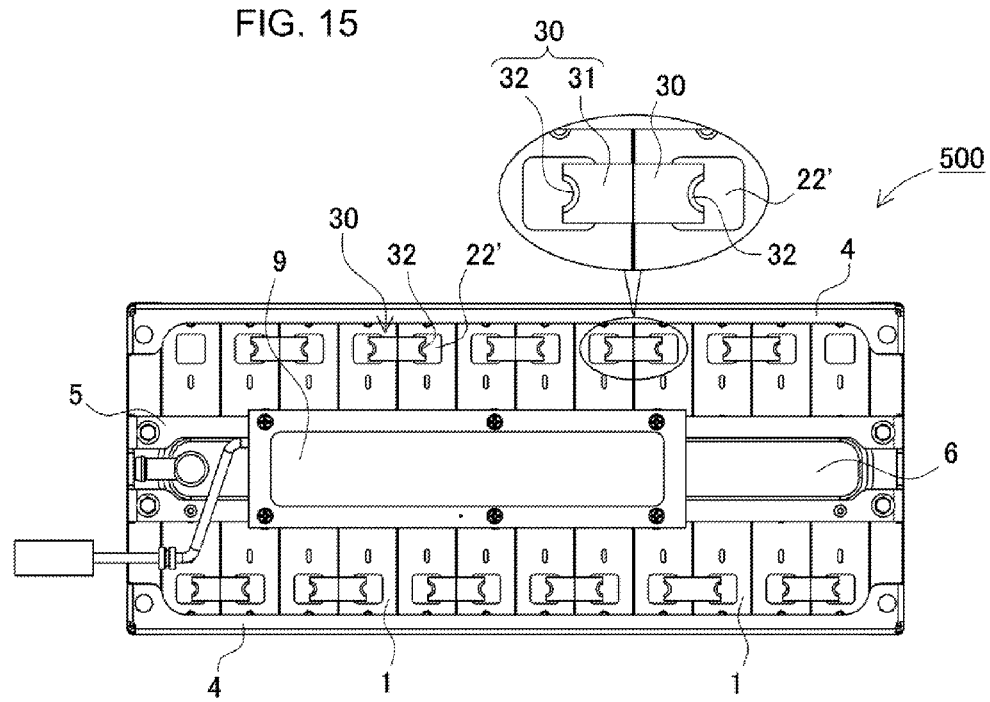
FIG. 15 is a schematic plan view of the bus bar related to the embodiment 5.

Moreover, in the above instance, in any case, the shape in the recess shaped portion of the bus bar end edge is corresponding to the shape of the electrode terminal. However, the electrode terminal which projects from the pedestal portion is not indispensable to welding to the bus bar, and it is possible to omit the electrode terminal. Namely, in the above embodiments, the bus bar is welded to not the electrode terminal, but the pedestal portion. In the other words, as shown in FIG. 25, the electrode terminal penetrating the welding ring is welded to the bus bar through the welding ring. However, in the present embodiments, the bus bar is not directly welded to the electrode terminal. Thus, the electrode terminal is not indispensable, and it can be omitted. Such an instance is shown in FIG. 15 as the power supply device 500 related to the embodiment 5. As shown in this figure, the thin portion 32 of the bus bar 30 can be welded to an arbitrary location on the pedestal portion 22'independent from the electrode terminal.

Here, in FIG. 6A or the like, as mentioned above, the electrode terminal 21 is used as the guide for positioning. Namely, the shape of the electrode terminal 21 is detected by the image processing, and as this location is used as the reference point, the bus bar is disposed. In this way, the electrode terminal has the function of the guide for positioning to determine the fixing position of the bus bar 30. Then, when the electrode terminal is not provided, for example, a mark engraved or printed on an arbitrary position of the pedestal portion, or the a quadrangle outline shape of the pedestal portion can be used as the guide for positioning in place of the electrode terminal. Further, as mentioned below in FIG. 20, one or more of the hole is opened and used as the guide for positioning.

Embodiment 6

Figure 16:
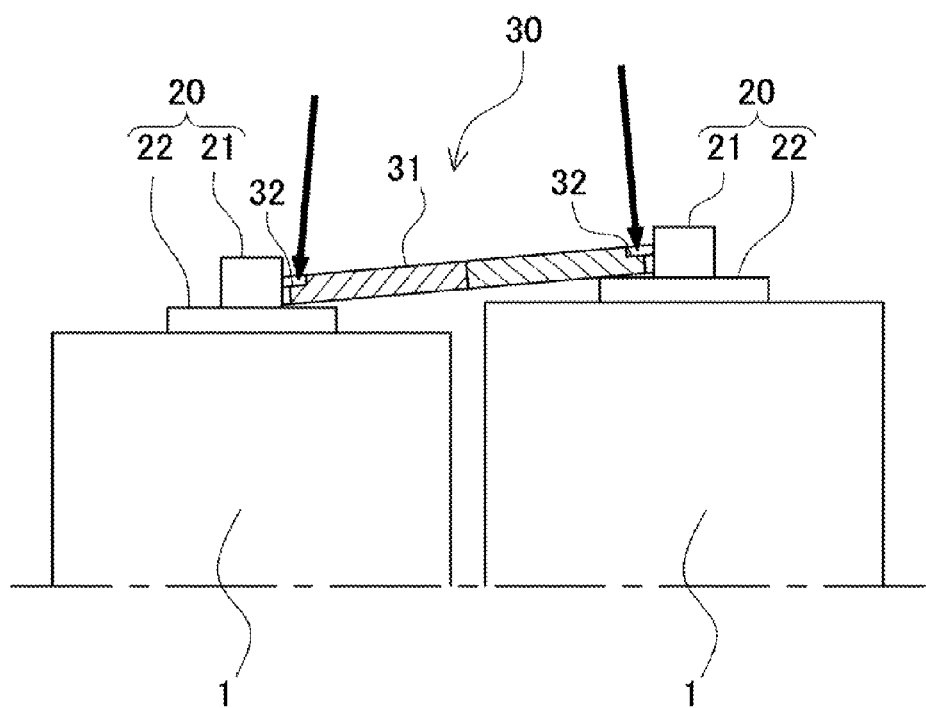
FIG. 16 is a schematic sectional view showing a state that a space exists between the bus bar and the electrode portion.
Figure 17A:
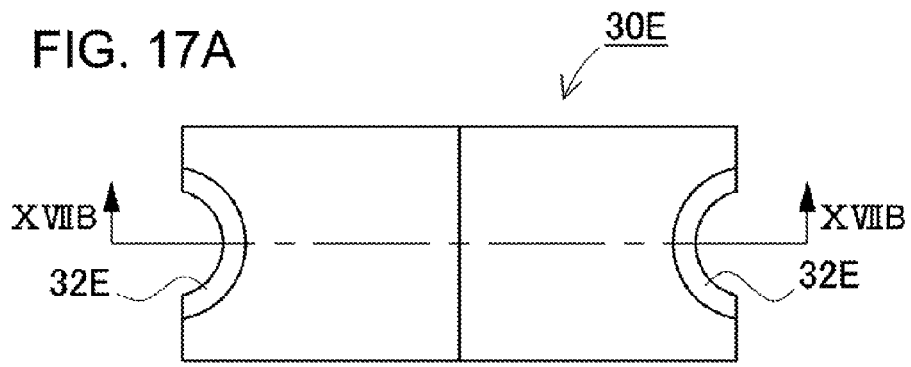
FIG. 17A is a plan view of the bus bar related to the embodiment 6.
Figure 17B:
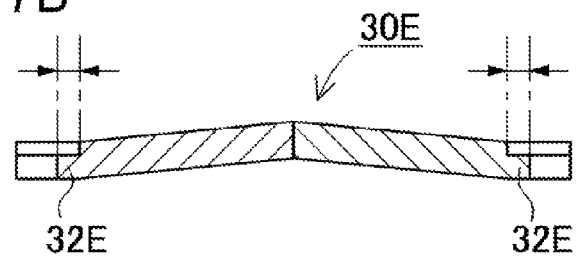
FIG. 17B is a vertical sectional view along a line XVIIB-XVIIB of the bus bar in FIG. 17A.

As mentioned above, when the bus bar and the electrode portion are welded without the welding ring, as shown in FIG. 16, the dispersion of the positions in the electrode terminals 21 in the height direction is a problem. Namely, when a space exists in a welding portion between the bus bar 30 and the electrode portion 20, a reliability of welding is decreased. Therefore, in order that such a space does not exist, the bus bar is bent in a mountain shape such that both ends of the bus bar easily contact the electrode portion 20 in a state that the bus bar is set on the upper surface of the battery cell. Such an instance as the embodiment 6 is shown in a plan view of FIG. 17A, and in a sectional view of FIG. 17B. As shown in these figures, the thick portion 31 is bent at the approximate center of the bus bar 30E in the mountain shape, and both ends of it can project in the lower direction relatively. As mentioned above, when the bus bar configures the clad metal of the dissimilar metals, by slightly inclining the contacting surfaces at which the dissimilar metals are joined, it is easily formed in the mountain shape.

Further, in order to prevent occurrence of the space, it is desirable that the bus bar is pushed toward the battery cell by a jig or the like. At this time, when a contacting portion of the bus bar which contacts the electrode portion is resilient, by added strength, the end edge of the bus bar is resiliently deformed, and then the space to the pedestal portion can disappear. In order that the bus bar can be resiliently deformed, the end edge of the bus bar is bent in a valley shape in the reverse direction to the bent direction of the mountain shape as shown in a sectional view of FIG. 17B. By this, the thin portion 32E at the end edge of the bus bar 30E can be easily resiliently deformed. Namely, the bus bar 30E is pressed from above downward at the time of welding, contacting portions at both ends are pushed to the pedestal portion 22, and the contacting portions by resilience tightly contact the contacting surface, and then the space disappears. Therefore, by laser welding in this state, those are surely welded without a space, and reliability of electrical connection can be improved.

Embodiment 7

Figure 18A:
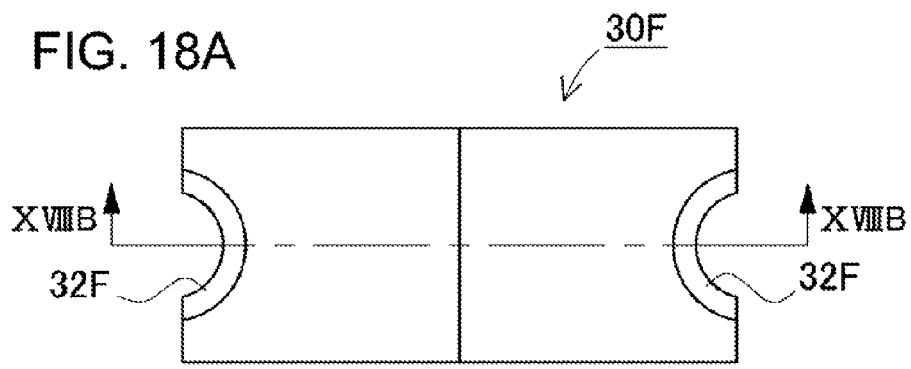
FIG. 18A is a plan view of the bus bar related to the embodiment 7.
Figure 18B:
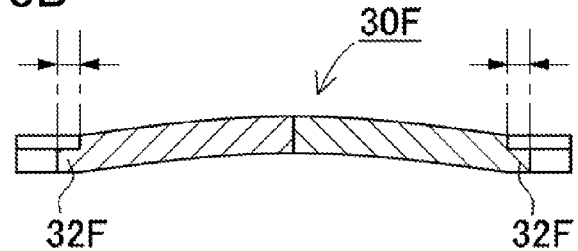
FIG. 18B is a vertical sectional view along a line XVIIIB-XVIIIB of the bus bar in FIG. 18A.

Moreover, in the above instances, the thick portion of the bus bar is bent in the mountain shape, but it is not necessarily limit to the mountain shape, and it can be in a curved shape. The bus bar 30F as the embodiment 7 shown in a sectional view of FIG. 18, has a curved shape at the center portion thereof. Also in this shape, the thin portion 32F can be resiliently deformed in the same as the above.

Embodiment 8

Figure 19A:
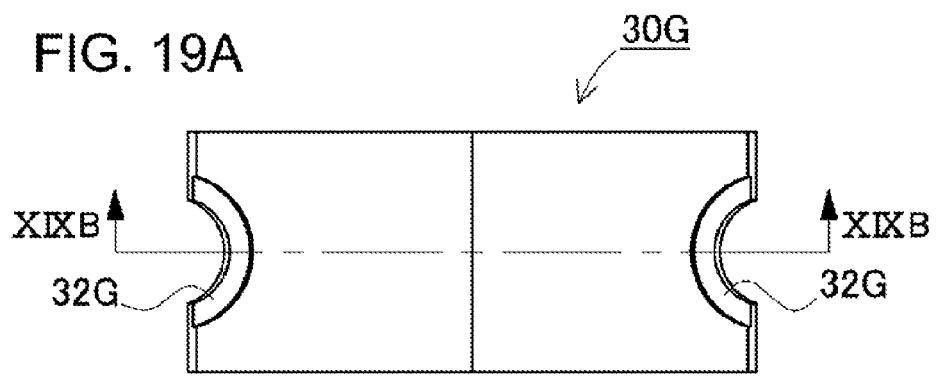
FIG. 19A is a plan view of the bus bar related to the embodiment 8.
Figure 19B:
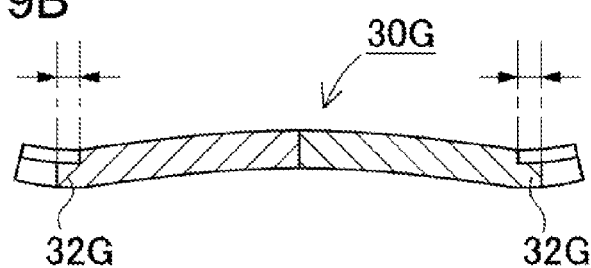
FIG. 19B is a vertical sectional view along a line XIXB-XIXB of the bus bar in FIG. 19A.

Also, in the same way, not only the thick portion is curved, but also the end edges of the bus bar can be curved in the reverse direction to this. Such an instance as the embodiment 8 is shown in FIG. 19. In the bus bar 30G shown in this figure, as a bent portion which contacts the pedestal portion is curved, the thin portion 32G can contact the pedestal portion in a larger area, and it prevent a space from occurring at the time of welding. Especially, in the battery cells which constitute the battery stacked, the dispersion of the position in the vertical direction in the battery cells happens. However, as the thin portion is formed in the curved shape, the thin portion can contact the pedestal portion at the vicinity of the bent portion. When a space exists at the time of laser welding, welding strength is decreased, and welding strength between the bus bar and the pedestal portion is dispersed. By the above structure, even though positional slippages of the battery cells occur, the thin portion 32G can contact the pedestal portion, and the welding strength can be maintained. Also, from this view point, it is desirable that a radius of curvature of the curved portion is large. In this way, in this specification, a word of "bent" also includes the meaning of a word of "curved".

Figure 20A:
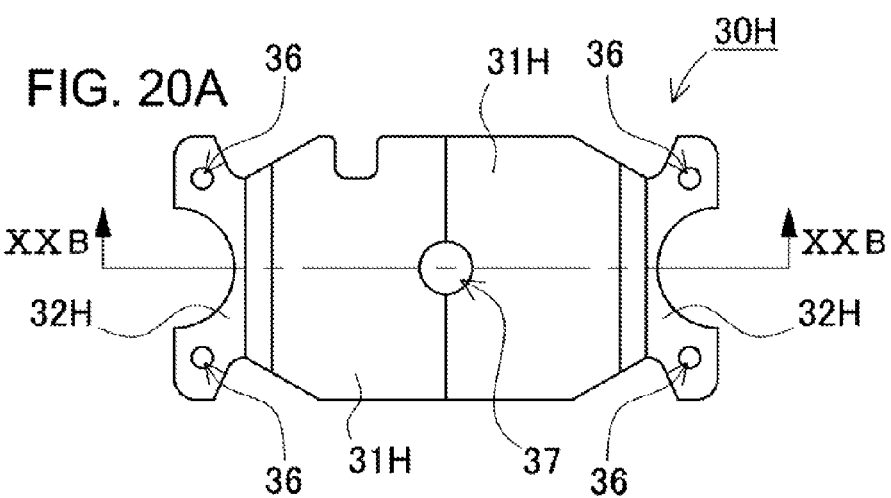
FIG. 20A is a plan view of the bus bar related to the embodiment 9.
Figure 20B:
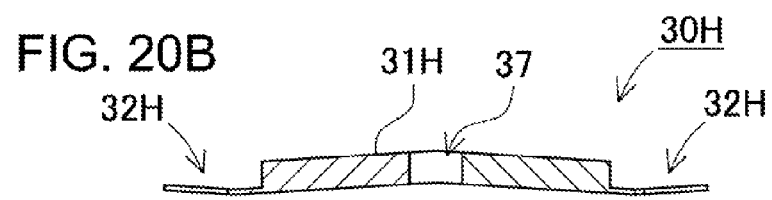
FIG. 20B is a vertical sectional view along a line XXB-XXB of the bus bar in FIG. 20A.

In the above instances, the welding portion is formed along the recess shaped portion formed at the thin portion. However, the present invention does not limit to this structure, also the welding portion can be formed linearly along the bent portion formed at the thin portion. Such an instance as the embodiment 9 is shown in FIG. 20 and FIG. 21. In this bus bar 30H, the laser beam is scanned linearly at the time of laser welding, and then the welding portion can be smoothly welded. On the other hand, compared with the recess or concave shaped portion of the welding portion 33, the length of the laser welding becomes short, and then the area of the welding portion becomes decreased, and the strength is decreased. Therefore, as shown as dashed lines in a plan view of FIG. 21, plural lines in spaced relationship with each other in parallel of the welding portions 33 are provided along the bent portion of the thin portion 32H, and an area of the welding portions 33H is increased, and then the welding strength can be improved. Here, the plural lines of the welding portions 33H are shifted from the bent portion to end edge side of the bus bar 30H. In addition, the welding portion is formed in a wave or zigzag shape along the bent portion of the thin portion, and then in the same way, the welding portion is made long, and the coupling strength can be improved.

(Bus Bar Positioning Guide 36)

Here, positioning guide can be formed in the bus bar. For example, a recess portion formed at the end edge of the bus bar be used as the bus bar positioning guide. In addition to this, one or more of through hole can be opened at the bus bar. Such an instance is shown in a plan view of FIG. 20A. This bus bar 30H has a round hole shape of through holes at the thin portion 32H at the end edges thereof. As the bus bar positioning guide 36 is of the round hole shape, the image processing can be easily carried out compared with a semi-circular shape like the recess shape. Further, as the bus bar positioning guides 36 are plural, the posture in the rotation direction can be unmistakably determined. In the instance of FIG. 20A, the through holes are opened at each corner portion of the end edge of the bus bar 30H. In addition, a second through hole 37 is opened at the center of the thick portion 31H of the bus bar 30H. As the second through hole 37 has a larger bore diameter than that of the through holes, and is distinguished from these. By the image processing of these, the posture of the bus bar 30H in the surface direction can be determined. The bus bar positioning guide 36 does not limit to this, and can be of a rectangular shape. Further, the bus bar positioning guide 36 does not limit the thin portion, and can be formed at the thick portion. Further, without the through hole formed, the outer shape of the bus bar can be used as the bus bar positioning guide.

Moreover, by forming a cut out at a part of the outer shape in the bus bar, the posture or the high and low position can be regulated. In the instance of FIG. 20A, a hollow 38 is formed at the left upper portion of the thick portion 31H of the bus bar 30. With the clue of this hollow 38, the upper or lower posture in a point symmetry shape of the bus bar 30H can be specified.

The aforementioned power supply devices can be used as a power supply for vehicles. The power supply device can be installed on electric vehicles such as hybrid cars that are driven by both an internal-combustion engine and an electric motor, and electric vehicles that are driven only by an electric motor. The power supply device can be used as a power supply device for these types of vehicles.

(Hybrid Car Power Supply Device)

Figure 22:
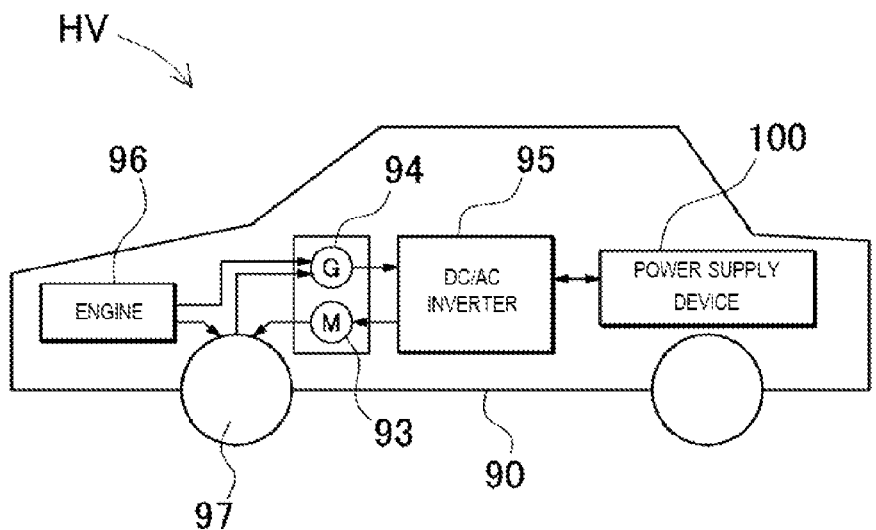
FIG. 22 is a block diagram showing one explanatory embodiment of a hybrid car driven by an engine and a motor in which the power supply device is installed.

FIG. 22 is a block diagram showing an exemplary hybrid car that is driven both by an engine and an electric motor, and includes the power supply device. The illustrated vehicle HV with the power supply device includes an electric motor 93 and an internal-combustion engine 96 that drive the vehicle HV, a power supply device 100 that supplies electric power to the electric motor 93, and an electric generator 94 that charges batteries of the power supply device 100, a vehicle body 90 that incorporates the engine 96, the motor 93, and the generator 94, and a wheel or wheels 97 that can be driven by the engine 96 or the electric motor 93, and drive the vehicle body 90. The power supply device 100 is connected to the electric motor 93 and the electric generator 94 via a DC/AC inverter 95. The vehicle HV is driven both by the electric motor 93 and the internal-combustion engine 96 with the batteries of the power supply device 100 being charged/discharged. The electric motor 93 is energized with electric power and drives the vehicle in a poor engine efficiency range, e.g., in acceleration or in a low speed range. The electric motor 93 is energized by electric power that is supplied from the power supply device 100. The electric generator 94 is driven by the engine 96 or by regenerative braking when users brake the vehicle so that the batteries of the power supply device 100 are charged.

(Electric Vehicle Power Supply Device)

Figure 23:
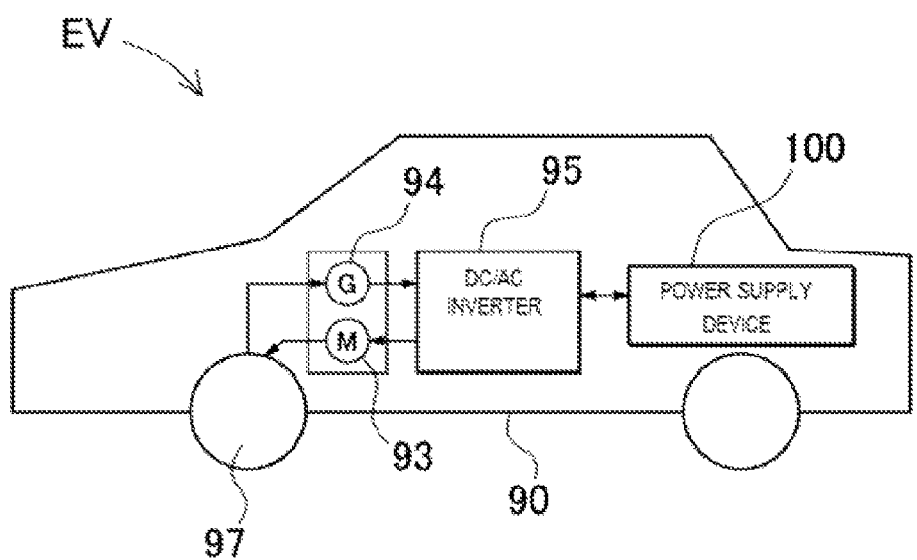
FIG. 23 is a block diagram showing one explanatory embodiment of an electric car driven only by a motor in which the power supply device is installed.

FIG. 23 shows an exemplary electric vehicle that is driven only by an electric motor, and includes the power supply device. The illustrated vehicle EV with the power supply device includes the electric motor 93, which drives the vehicle EV, the power supply device 100, which supplies electric power to the electric motor 93, and the electric generator 94, which charges batteries of the power supply device 100, a vehicle body 90 that incorporates the motor 93 and the generator 94, and a wheel or wheels 97 that can be driven by the electric motor 93, and drive the vehicle body 90. The electric motor 93 is energized by electric power that is supplied from the power supply device 100. The electric generator 94 can be driven by vehicle EV regenerative braking so that the batteries of the power supply device 100 are charged.

(Power Storage Type Power Supply Device)

Figure 24:
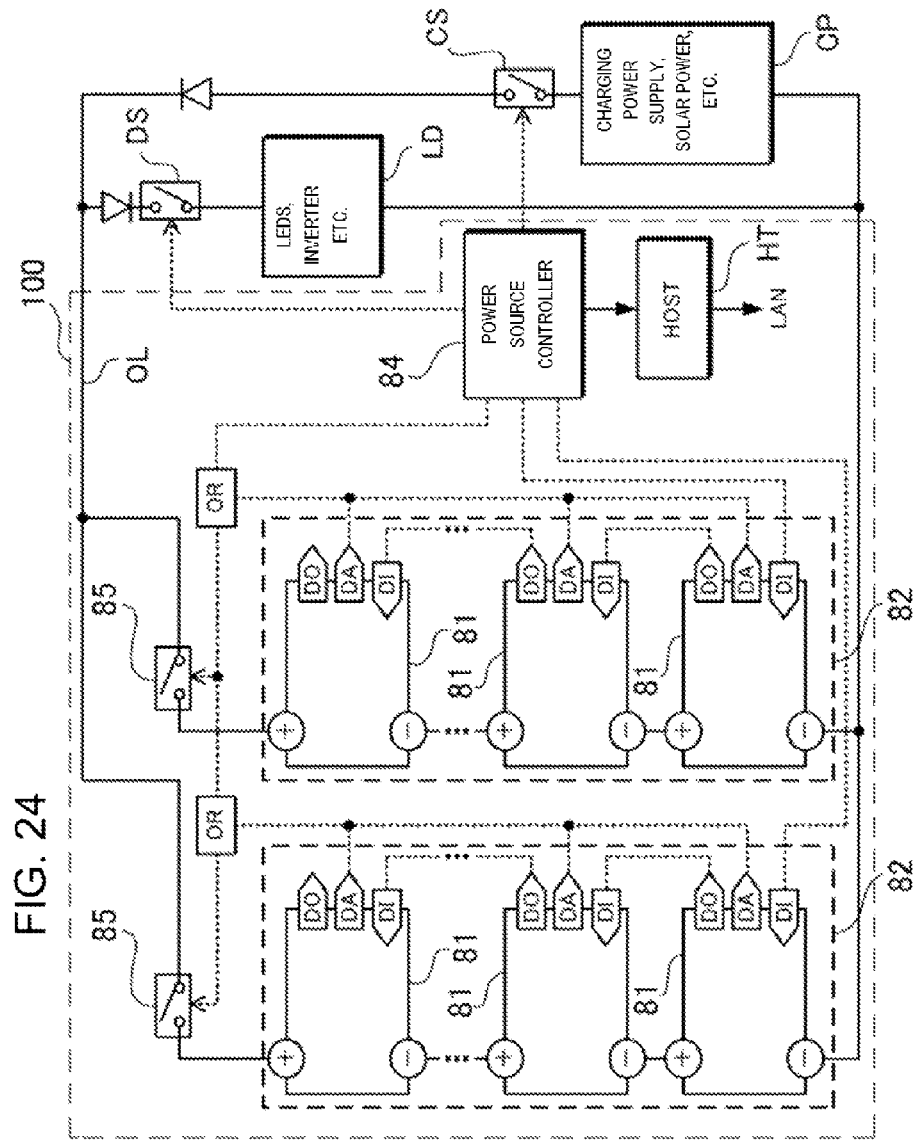
FIG. 24 is a block diagram showing one explanatory embodiment of a storage battery device using the power supply device.

The power supply device can be used not only as power supply of mobile unit but also as stationary power storage. For example, examples of stationary power storage devices can be provided by an electric power system for home use or plant use that is charged with sunlight or with midnight electric power and is discharged when necessary, a power supply for street lights that is charged with sunlight during the daytime and is discharged during the nighttime, or a backup power supply for signal lights that drives signal lights in the event of a power failure. FIG. 24 shows an exemplary circuit diagram. This illustrated power supply device 100 includes battery units 82 each of which includes a plurality of battery packs 81 that are connected to each other. In each of battery packs 81, a plurality of rectangular battery cells 1 are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns the charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LO. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the exemplary power supply device shown in FIG. 24, the power supply controller is connected to a host device HT based on existing communications protocols such as UART and RS-232C. Also, the power supply device may include a user interface that allows users to operate the electric power system if necessary.

Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel.

INDUSTRIAL APPLICABILITY

A power supply device, a vehicle and a storage battery device equipped with the power supply device, and a method for manufacturing the power supply device according to the present invention can be suitably used as power supply devices of plug-in hybrid vehicles and hybrid electric vehicles that can switch between the EV drive mode and the HEV drive mode, electric vehicles, and the like. A vehicle including this power supply device according to the present invention can be suitably used as plug-in hybrid vehicles, hybrid electric vehicles, electric vehicles, and the like. Also, a power supply device according to the present invention can be suitably used as backup power supply devices that can be installed on a rack of a computer server, backup power supply devices for wireless communication base stations, electric power storages for home use or plant use, electric power storage devices such as electric power storages for street lights connected to solar cells, backup power supplies for signal lights, and the like.

The invention claimed is:

1. A power supply device comprising:
   plural battery cells having electrode portions; and
   bus bars connecting the electrode portions of the plural battery cells each other,
   wherein each of the electrode portions includes
   (i) a pedestal portion having a flat surface and (ii) an electrode terminal projecting from the pedestal portion,
   wherein each of the bus bars includes a thick portion formed at a center of the bus bar and a thin portion thinner than the thick portion formed in at least one part of an end edge of the bus bar,
   wherein the thin portion includes a welding portion to which the flat surface of the pedestal portions is welded,
   wherein the thin portion is formed in a recess shape as a recess shaped portion in a plan view which is recessed from the end edge of the bus bar,
   wherein the electrode terminal is in a cylindrical shape, and
   wherein the recess shaped portion is formed in a semicircular shape along the cylindrical shape of the electrode terminal.

2. The power supply device according to claim 1,
   wherein the thin portion is formed in a step shape at the at least one part of the end edge of the bus bar where an upper surface side is cut out in the sectional view.

3. The power supply device according to claim 1,
   wherein the width of the thin portion is less than half the electrode portion.

4. The power supply device according to claim 1,
   wherein the thin portion is disposed at a side surface of the electrode terminal, and the thin portion is fixed to the pedestal portion.

5. The power supply device according to claim 1,
   wherein a radius of the semicircular shaped portion is larger than a radius of the electrode terminal.

6. The power supply device according to claim 1,
   wherein the thin portion is formed to be capable to be resiliently deformed.

7. The power supply device according to claim 1,
   wherein the welding portion is provided along a bent portion of the thin portion.

8. The power supply device according to claim 7,
   wherein the welding portion is provided in a shape of plural lines along the bent portion of the thin portion.

9. The power supply device according to claim 1,
   wherein the welding portion is provided along the recess shaped portion.

10. The power supply device according to claim 1,
    wherein each of the bus bars further includes a bus bar positioning guide on an upper surface thereof.

11. The power supply device according to claim 10,
    wherein the bus bar positioning guide is at least one through hole opened at the bus bar.

12. The power supply device according to claim 1,
    wherein the thin portion is welded to the electrode portion by fiber laser.

13. The power supply device according to claim 1,
    wherein each of the bus bars includes a clad metal in which dissimilar metals are joined.

14. An electric vehicle equipped with the power supply device according to claim 1, the electric vehicle comprising:
    an electric motor being energized by electric power that is supplied from the power supply device;
    a vehicle body having the power supply device and the electric motor; and
    a wheel being driven by the electric motor, and driving the vehicle body.

15. A power supply device comprising:
    plural battery cells having electrode portions; and
    bus bars connecting the electrode portions of the plural battery cells to each other,
    wherein each of the electrode portion includes a pedestal portion having a flat surface,
    wherein each of the bus bars includes a thick portion formed at a center of the bus bar and a thin portion thinner than the thick portion formed in at least one part of an end edge of the bus bar, wherein the thin portion includes a welding portion to which the flat surface of the pedestal portions is welded, and wherein each of the bus bars is bent in a mountain shape in a sectional view.

16. The power supply device according to claim 15, wherein the thin portion is bent in a reverse direction to a bent direction of the mountain shape in the sectional view.

17. The power supply device according to claim 16, wherein a vicinity of a boundary between the thin portion and the thick portion is bent in the reverse direction to the bent direction of the mountain shape in the sectional view.

18. The power supply device according to claim 15, wherein the welding portion is located nearer to the end edge of the bus bar than the boundary between the thin portion and the thick portion.

\* \* \* \* \*